(12) United States Patent
Kalush et al.

(10) Patent No.: US 10,387,810 B1
(45) Date of Patent: Aug. 20, 2019

(54) SYSTEM AND METHOD FOR PROACTIVELY PROVISIONING RESOURCES TO AN APPLICATION

(71) Applicant: Dell Software Inc., Aliso Viejo, CA (US)

(72) Inventors: Israel Kalush, Kiriat Ono (IL); Oren Tibi Solomon, Modi'in (IL)

(73) Assignee: Quest Software Inc., Aliso Viejo, CA (US)

( * ) Notice: Subject to any disclaimer, the term of this patent is extended or adjusted under 35 U.S.C. 154(b) by 627 days.

(21) Appl. No.: 14/153,218

(22) Filed: Jan. 13, 2014

Related U.S. Application Data

(63) Continuation-in-part of application No. 14/014,637, filed on Aug. 30, 2013, and a continuation-in-part of application No. 14/014,707, filed on Aug. 30, 2013, now Pat. No. 9,245,248.

(60) Provisional application No. 61/707,602, filed on Sep. 28, 2012.

(51) Int. Cl.
G06Q 10/00 (2012.01)
G06Q 10/06 (2012.01)

(52) U.S. Cl.
CPC .............................. *G06Q 10/06311* (2013.01)

(58) Field of Classification Search
USPC .......................................................... 705/7.22
See application file for complete search history.

(56) References Cited

U.S. PATENT DOCUMENTS

| | | |
|---|---|---|
| 6,453,253 B1 | 9/2002 | Ito |
| 6,611,726 B1 | 8/2003 | Crosswhite |
| 6,763,128 B1 | 7/2004 | Rogers et al. |
| 6,880,002 B2 | 4/2005 | Hirschfeld et al. |
| 6,909,198 B2 | 6/2005 | Ragwitz et al. |
| 6,944,798 B2 | 9/2005 | Stephenson et al. |
| 7,203,655 B2 | 4/2007 | Herbert et al. |
| 7,308,366 B2 | 12/2007 | Han |

(Continued)

OTHER PUBLICATIONS

Thomas, Shane, "International Search Report," prepared for PCT/US13/61272 as dated Jan. 29, 2014, 4 pages.

(Continued)

*Primary Examiner* — Johnna R Loftis
*Assistant Examiner* — Allison M Robinson
(74) *Attorney, Agent, or Firm* — Winstead PC

(57) ABSTRACT

In one embodiment, a method includes executing at least one application. The method further includes collecting, at periodic intervals as the least one application executes, an application load of each of the at least one application. In addition, the method includes generating, based at least in part on the collecting, an application-behavior baseline for each of the at least one application. The application-behavior baseline includes a plurality of projected application loads over a future period of time. The application-behavior baseline has a configurable time resolution. The method also includes automatically determining, for a subperiod of the future period, a quantity of compute resources required to manage the at least one application in satisfaction of at least one performance criterion. Moreover, the method includes causing the determined quantity of compute resources to be proactively provisioned to the at least one application in advance of a start of the subperiod.

19 Claims, 19 Drawing Sheets

(56) References Cited

U.S. PATENT DOCUMENTS

| | | |
|---|---|---|
| 7,430,692 B2 | 9/2008 | White, III et al. |
| 7,644,098 B2 | 1/2010 | Patel et al. |
| 7,765,122 B2 | 7/2010 | Shan |
| 7,953,692 B2 | 5/2011 | Bower et al. |
| 7,979,245 B1 | 7/2011 | Bourlatchkov et al. |
| 8,015,454 B1 | 9/2011 | Harrison et al. |
| 8,027,743 B1 | 9/2011 | Johnston |
| 8,117,308 B1 | 2/2012 | Patel |
| 8,200,454 B2 | 6/2012 | Dorneich et al. |
| 8,397,240 B2 | 3/2013 | Yang et al. |
| 2001/0051862 A1 | 12/2001 | Ishibashi et al. |
| 2003/0009399 A1 | 1/2003 | Boerner |
| 2003/0046396 A1 | 3/2003 | Richter et al. |
| 2004/0249775 A1 | 12/2004 | Chen |
| 2005/0091176 A1 | 4/2005 | Nishiuma et al. |
| 2005/0216793 A1 | 9/2005 | Entin et al. |
| 2007/0118419 A1 | 5/2007 | Maga et al. |
| 2007/0244676 A1 | 10/2007 | Shang et al. |
| 2009/0300173 A1 | 12/2009 | Bakman et al. |
| 2010/0153157 A1* | 6/2010 | Wade ............... G06Q 10/0631 705/7.12 |
| 2011/0153603 A1* | 6/2011 | Adiba ................ G06F 16/2477 707/737 |
| 2011/0191461 A1* | 8/2011 | Dasgupta ............ G06F 15/173 709/224 |
| 2011/0208701 A1* | 8/2011 | Jackson ................ G06Q 10/10 707/687 |
| 2011/0302578 A1* | 12/2011 | Isci ....................... G06F 9/5077 718/1 |
| 2012/0239739 A1* | 9/2012 | Manglik ............... G06F 9/5077 709/203 |
| 2012/0246646 A1 | 9/2012 | Bakman |
| 2012/0284713 A1 | 11/2012 | Ostermeyer et al. |
| 2012/0310376 A1 | 12/2012 | Krumm et al. |
| 2013/0218547 A1 | 8/2013 | Ostermeyer et al. |
| 2014/0032091 A1 | 1/2014 | Arcot et al. |

OTHER PUBLICATIONS

Wikipedia, "Prediction Interval", Jun. 14, 2012, 8 pages.
Microsoft, "4: Autoscaling and Windows Azure", http://msdn.microsoft.com/en-us/library/hh680945(v=pandp.50.aspx, Jun. 7, 2012, 69 pages.

* cited by examiner

SYSTEM AND METHOD FOR PROACTIVELY PROVISIONING RESOURCES TO AN APPLICATION

CROSS-REFERENCE TO RELATED APPLICATIONS

This patent application is a continuation-in-part of U.S. patent application Ser. No. 14/014,637, filed on Aug. 30, 2013. This patent application is also a continuation-in-part of U.S. patent application Ser. No. 14/014,707, filed on Aug. 30, 2013. U.S. patent application Ser. No. 14/014,637 and U.S. patent application Ser. No. 14/014,707 claim priority from U.S. Provisional Patent Application No. 61/707,602. U.S. Provisional Patent Application No. 61/707,602, U.S. patent application Ser. No. 14/014,637, and U.S. patent application Ser. No. 14/014,707 are hereby incorporated by reference in their entirety.

BACKGROUND

Technical Field

The present invention relates generally to data analysis and more particularly, but not by way of limitation, to systems and methods for ranking period combinations.

History of Related Art

Anticipating a software application's need for compute resources can be complicated. A user associated with an organization or entity can look at the application load from one month to the next to determine whether additional resources will be needed in the future. However, this analysis is often not sufficient because, for example, the amount of resources used over a given time period is rarely static. For example, depending on the software application, load may be greater on weekdays, dip during lunch hours, etc. In some cases, a time period that is normally associated with low application load, such as midnight, may sometimes have a high application load. In addition, various software applications may be affected differently at different time periods or as a result of different types of operations. In some cases, application load may unexpectedly change due, for example, to a successful product launch that may increase the use of computing resources (e.g., web servers, sales servers, etc.).

For at least the aforementioned reasons, comparing application load on a scheduled periodic basis (e.g., monthly) for purposes of provisioning compute resources may be insufficient for many organizations. Periodic spikes in the application load generally result in under-provisioning of resources, which can further cause the software applications to be unresponsive or ineffective. Under such circumstances, performance requirements specified, for example, by service level agreements (SLAs), may not be met. To avoid under-provisioning of resources, oftentimes very large quantities of resources may be provisioned to the software application so that sufficient resources are present when the periodic spikes occur. However, this practice is expensive and results in under-utilized resources (i.e., resource waste) at most other times.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes executing at least one application on a computer system. The method further includes the computer system collecting, at periodic intervals as the least one application executes, an application load of each of the at least one application. In addition, the method includes the computer system generating, based at least in part on the collecting, an application-behavior baseline for each of the at least one application. The application-behavior baseline includes a plurality of projected application loads over a future period of time. The application-behavior baseline has a configurable time resolution. The method also includes the computer system automatically determining, for a subperiod of the future period, a quantity of compute resources required to manage the at least one application in satisfaction of at least one performance criterion. Moreover, the method includes the computer system causing the determined quantity of compute resources to be proactively provisioned to the at least one application in advance of a start of the subperiod.

In one embodiment, an information handling system includes at least one server computer. The at least one server computer is operable to implement a method. The method includes executing at least one application. The method further includes collecting, at periodic intervals as the least one application executes, an application load of each of the at least one application. In addition, the method includes generating, based at least in part on the collecting, an application-behavior baseline for each of the at least one application. The application-behavior baseline includes a plurality of projected application loads over a future period of time. The application-behavior baseline has a configurable time resolution. The method also includes automatically determining, for a subperiod of the future period, a quantity of compute resources required to manage the at least one application in satisfaction of at least one performance criterion. Moreover, the method includes causing the determined quantity of compute resources to be proactively provisioned to the at least one application in advance of a start of the subperiod.

In one embodiment, a computer-program product comprising a non-transitory computer-usable medium having computer-readable program code embodied therein, the computer-readable program code adapted to be executed to implement a method. The method includes executing at least one application. The method further includes collecting, at periodic intervals as the least one application executes, an application load of each of the at least one application. In addition, the method includes generating, based at least in part on the collecting, an application-behavior baseline for each of the at least one application. The application-behavior baseline includes a plurality of projected application loads over a future period of time. The application-behavior baseline has a configurable time resolution. The method also includes automatically determining, for a subperiod of the future period, a quantity of compute resources required to manage the at least one application in satisfaction of at least one performance criterion. Moreover, the method includes causing the determined quantity of compute resources to be proactively provisioned to the at least one application in advance of a start of the subperiod.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
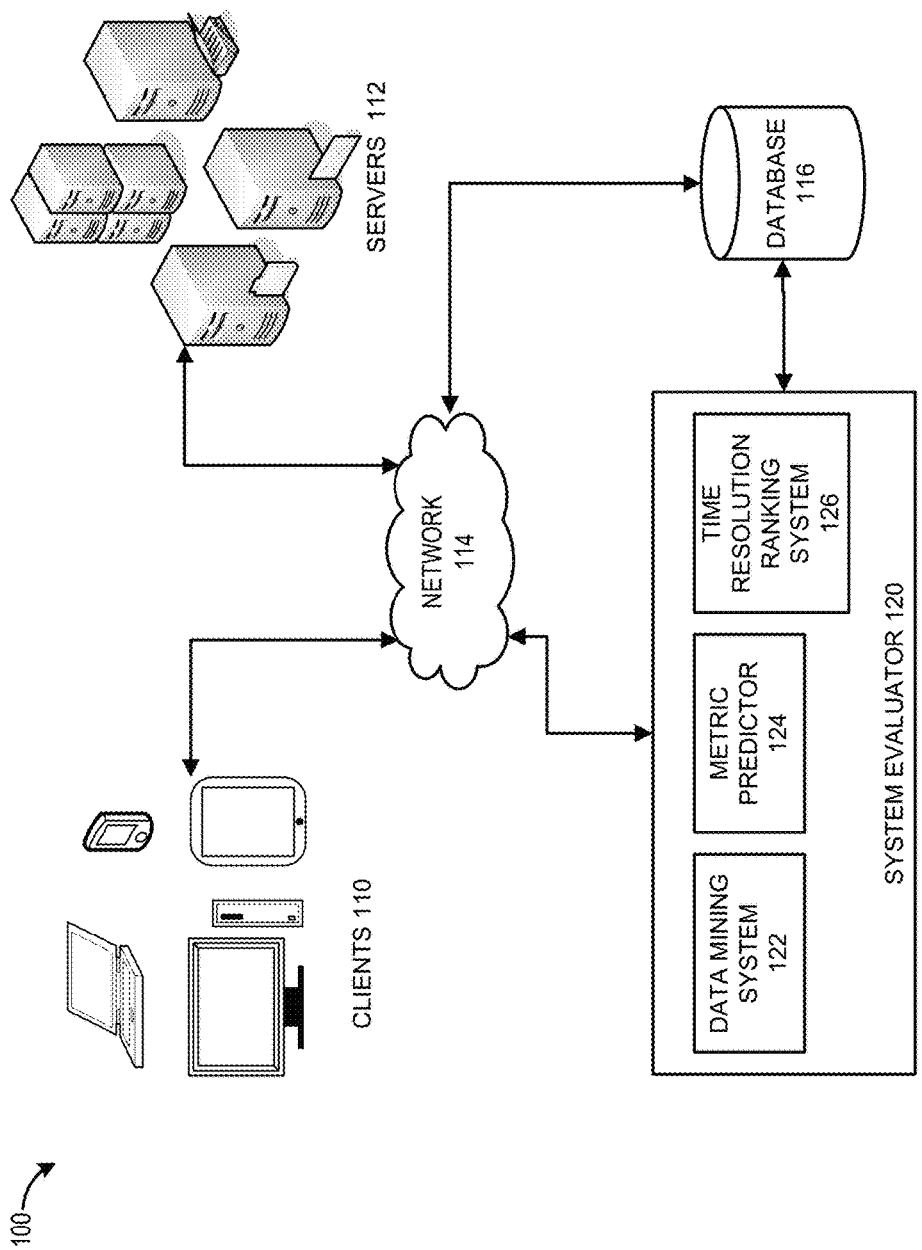
FIG. 1 is a block diagram of an embodiment of a networked computing environment.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Embodiments of the present disclosure describe systems and processes for predicting or projecting the utilization of a resource based on one or more metrics. In some cases, at least some of the metrics may represent resources associated with a computing system, such as processor utilization or availability, memory utilization or availability, etc. Alternatively, or in addition, at least some of the metrics may be associated with computer characteristics that can be associated with a resource, but which may not have a one-to-one correspondence with a computing resource. For example, one metric may be average access time of a file over a network. This metric may be associated with network bandwidth, but can also be associated with other computing resources, such as the amount of memory of the computing system, the speed of the memory, the number of access connections the storage device can support simultaneously, etc.

For purposes of this patent application, a period combination can be considered a set of one or more time periods over which data can be generated, aggregated and/or analyzed. Time periods, often referred to herein simply as periods, typically represent units of time such as, for example, units of wall time, system time, and/or other units for measuring the passage of time (arbitrary or otherwise). For example, in certain embodiments that utilize wall time, the period combinations can include periods of hour, day, week, month, and/or the like. For simplicity of description, the remainder of this disclosure will provide examples of time periods that utilize wall time. However, it should be appreciated that the term time period is not so limited and that various embodiments may utilize other manners of measuring or dividing time. Measurement segments, often referred to herein simply as segments, are typically divisions of a time period. For example, a time period of "day" may include twenty-four one-hour segments, twelve two-hour segments, six four-hour segments, etc.

As described in greater detail below, certain embodiments described herein utilize period combinations as data structures that provide one or more time perspectives of a set of actual values for a metric of interest. For example, in various embodiments, a period combination can be hierarchically structured as a combination of time periods that each includes a plurality of measurements segments for the time period, each segment of which further includes respective actual values of the metric of interest for that segment.

Consider an example where the metric of interest is processor utilization and the set of actual values contains values for the processor utilization at a time resolution, or sampling rate, of one hour. For purposes of the example, assume that the period combination includes periods of "month," "week," and "day." Each period can include a number of segments suitable for the period and thereby define a sampling rate, or time resolution, for the period. For example, the month period could include one-hundred twenty-four segments and thereby have a six-hour time resolution (if a month is defined as thirty-one days), the week period could include fifty-six segments and thereby have a three-hour time resolution, and the day period could include twenty-four segments and thereby have a one-hour time resolution. Therefore, the month period could provide data descriptive of processor utilization during each of a first six-hour segment of a month, a second six-hour segment of a month, etc. Likewise, the week period could provide data descriptive of processor utilization during each of a first three-hour segment of a week, a second three-hour segment of a week, etc. In similar fashion, the day period could provide data descriptive of processor utilization during each of a first one-hour segment of a day, the second one-hour segment of a day, etc.

For a given segment, the data descriptive of the metric of interest (processor utilization for purposes of this example) may be actual values for that metric (raw or filtered), statistical data representative of actual values for that metric, and/or the like. For example, if the set of actual values included an exemplary value for 12:01 am on Monday, Jul. 1, 2013, that exemplary value may be considered to have occurred during a first six-hour segment of the month period, a ninth three-hour segment of the week period (if Sunday is defined as the first day of the week), and a first one-hour segment of the day period. Accordingly, the data relating to the exemplary value may be contained within the first six-hour segment of the month period, the ninth three-hour segment of the week period, and the first one-hour segment of the day period. Thus, whenever a given period combination includes more than one time period, each period thereof can be used to provide a different time perspective of a same set of actual values for the metric of interest.

In some embodiments, the systems described herein can identify, from among a set of alternative period combinations, a period combination that best characterizes a given metric. The set of alternative period combinations may differ, for example, in the particular mix of time periods contained therein, a time resolution of one or more time periods contained therein, and/or the like. In a typical embodiment, the systems described herein can insert and/or aggregate a set of data associated with the given metric (e.g., actual values) into the period combination to facilitate analysis and generation of a predicted value for a future time point. The systems can then, in some cases, present a user with the predicted value.

I. Metric Value Prediction Systems and Processes

System Overview

FIG. 1 is a block diagram of an embodiment of a networked computing environment 100. The networked computing environment 100 includes a system evaluator 120, which can access one or more computing systems, such as one or more clients 110 and/or one or more servers 112. Generally, the system evaluator 120 communicates with the computing systems via the network 114. However, it is also possible for the system evaluator 120 to access a computing system directly via a wired or wireless connection.

The system evaluator 120 is capable of analyzing one or more computing systems to predict the future performance of the computing systems with respect to one or more metrics. These metrics can include any type of hardware or software characteristic or attribute that can be used to measure the performance of a computing system and/or the availability of resources with respect to the computer system. Some non-limiting examples of metrics that may be analyzed by the system evaluator 120 include: memory utilization, processor utilization, operation completion rate, storage utilization, network bandwidth, and the like. Further, the system evaluator 120 can analyze a number of time resolutions for evaluating a metric to determine the time resolution that is statistically likely to provide the most accurate prediction for a future value of the metric. Advantageously, in certain embodiments, by evaluating multiple time resolutions, the system evaluator 120 can more accurately make predictions of future consumption and performance of computing resources compared to pre-determined evaluation time resolutions.

As illustrated in FIG. 1, the system evaluator 120 can include a data mining system 122, a metric predictor 124, and a time resolution ranking system 126. In addition, the system evaluator 120 may be configured to communicate with a database 116, either through a wired or wireless connection, or via the network 114. Alternatively, in some cases, the system evaluator 120 may include the database 116.

Using the data mining system 122, the system evaluator 120 can collect and/or access data relating to any number and type of metrics as described above for one or more computing systems (e.g., the clients 110, the servers 112, etc.). The data mining system 122 may access the computing systems directly or via the network 114. Alternatively, or in addition, the data mining system 122 may access the data relating to a set of metrics by accessing the database 116, which can be configured to store data collected from the computing systems. The database 116 may obtain the data from the system evaluator 120 (e.g., via the data mining system 122), the data may be provided to the database 116 by the computing systems (e.g., via a data agent associated with one or more computing systems), or a data collector (not shown) may collect the data from the computing systems for storage in the database 116.

The metric predictor 124 is configured, for one or more metrics, to analyze data related to the one or more metrics. As previously described, this data may be accessed by the data mining system 122 from the computing systems and/or from the database 116. Based, at least in part, on the analysis of the collected data, the metric predictor can predict a future value for the one or more metrics. The metric predictor 124 can perform the process of predicting a future value for a metric using one or more different combinations or permutations of time periods and measurement segments (i.e., period combinations). The measurement segments can generally include any time at which data is read or accessed, and/or aggregated from a series of data readings within a measurement segment. For example, the measurement segments may be one hour, two hours, four hours, one day, two days, a working day, a weekend, a weekend day, one week, one month, etc. Further, the time periods can generally include any time period over which data is read or accessed for one or more measurement segments. For example, the time periods may be one hour, two hours, four hours, one day, two days, a working day, a weekend, a weekend day, one week, one month, etc.

In certain cases, any combination of time periods and measurement segments are possible and the selection of the one or more combinations may depend on the metric to be measured. For example, for a metric that fluctuates with workload (e.g., processor utilization), one combination selected may be a time period of a working day and a measurement segment of an hour. Thus, assuming the working day includes the entire twenty-four hour weekday, the total number of measurement periods would be twenty-four, one measurement period per hour of the day. Alternatively, if the working day is limited to working hours, the total number of measurement periods would depend on the number of hours a business is open (e.g., eight or nine hours, etc.). As another example, for a metric related to a resource that may, in some cases, be consumed and require the addition of new sources of the resource over time (e.g., storage space for a backup system) one combination selected may be a time period of a month (e.g., 30-days) with measurement periods of one day or one week.

In some cases, a measurement segment is a fixed period of time (e.g., one hour) and the number of measurement segments over a time period is based on the length of the time period. Thus, for example, a weekday may have twenty-four segments. In other cases, the system evaluator 120 may use a fixed number of measurement segments for analyzing data and predicting metric values over a time period. For example, if the system evaluator 120 is configured to use twenty-four segments, a weekday time period will have twenty-four measurement segments each of length one hour. However, if a weekend time period is selected, the time period will have twenty-four measurement segments with each segment being two hours long.

Further, based at least in part on the analysis of data related to a metric, the metric predictor 124 can predict or forecast a value for the metric at a point in time. In some cases, this prediction may be within a particular probability or threshold probability. Advantageously, in certain embodiments, by predicting a future value for a metric, the system evaluator 120 can alert a user (e.g., an administrator) of the status of an organization's computing resources thereby enabling the user to reconfigure one or more computing systems and/or to increase available computing system resources.

As previously mentioned, the metric predictor 124 can analyze data over multiple permutations of time periods and measurement segments. The time resolution ranking system 126 can rank the various permutations of time periods and measurement segments based on a number of factors including, for example, the metric being predicted, user preferences, and the accuracy of previous predictions.

Example of a Metric Value Prediction Process

Figure 2A:
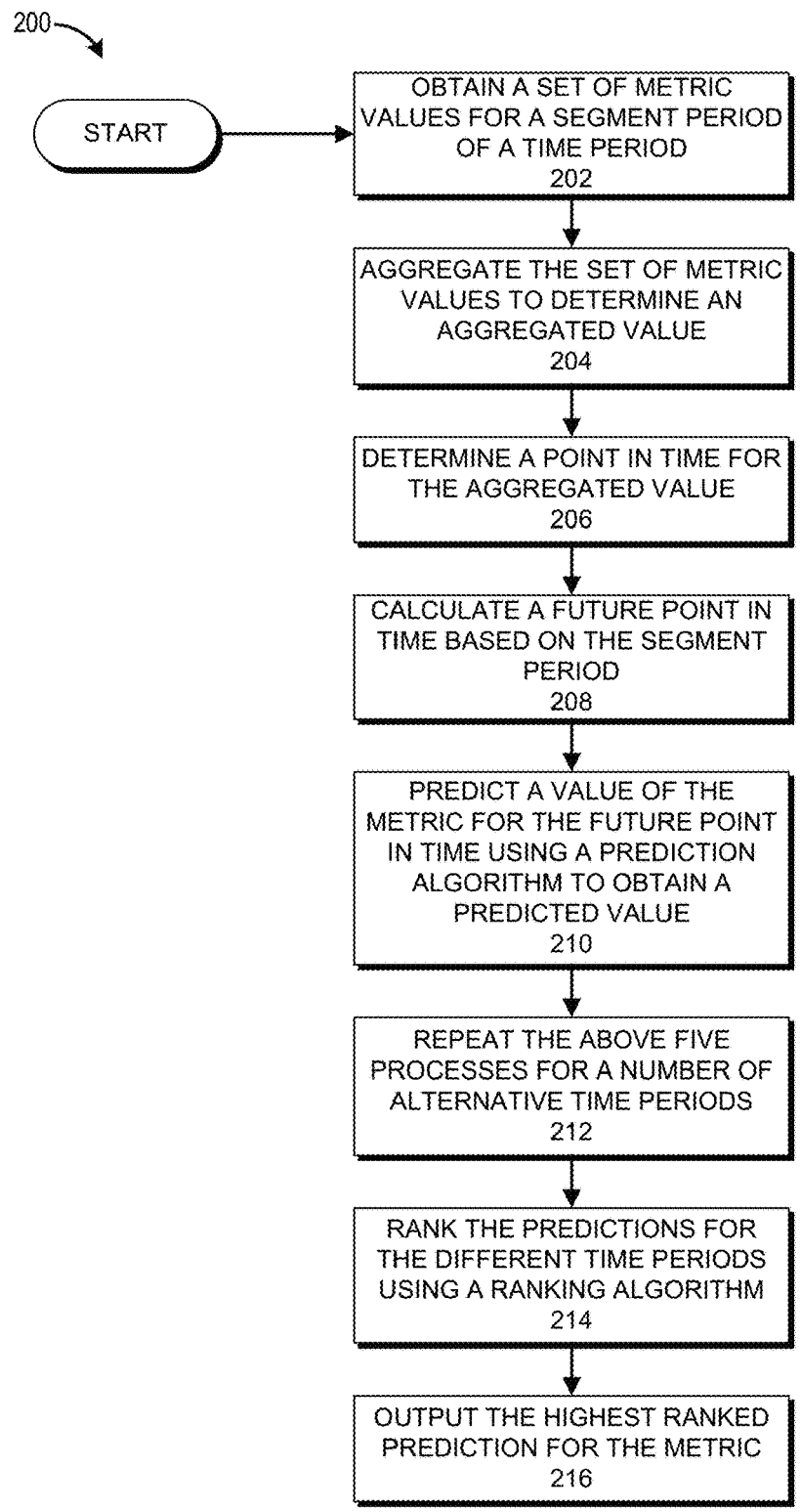
FIG. 2A illustrates a flowchart of an embodiment of a metric value prediction process.

FIG. 2A illustrates a flowchart of an embodiment of a metric value prediction process 200. The process 200 can be implemented, at least in part, by any system that can aggregate data related to one or more metrics for one or more computing systems. Further, the process 200 can be implemented, at least in part, by any system that can use the data to predict or forecast a future value for one or more of the metrics. For example, the process 200, in whole or in part, can be implemented by the system evaluator 120, the data mining system 122, the metric predictor 124, and the time resolution ranking system 126. Although any number of systems, in whole or in part, can implement the process 200, to simplify discussion, portions of the process 200 will be described with reference to particular systems.

The process 200 begins at block 202 where, for example, the data mining system 122 obtains a set of metric values, or data associated with a metric, for a segment period, or measurement segment, for a given time period. For example, the data mining system 122 can obtain data for a one hour segment or a four hour segment over a time period that may include one or more multiples of the segment period (e.g., eight hours, twenty-four hours, one week, one month, etc.).

In some cases, the set of metric values is a single value representing the metric for that segment. This value may be obtained at a specific point during the segment time period. For example, the metric value may be obtained at the middle of the segment period, at the beginning of the segment period, or at the end of the segment period. In other cases, the set of metric values may include a number of values recorded or accessed throughout the segment period. For example, the data mining system 122 may access data for a metric once per minute. In such cases, the set of metric values for a particular metric (e.g., network utilization, processor utilization, memory utilization) will include sixty values for a segment that is one hour in length or one-hundred and twenty values for a segment that is two hours in length. In other cases, the set of metric values for a metric may be recorded once per minute, but the data mining system 122 may access the metric values once per hour. In such cases, the data mining system 122 may access some or all of the metric values recorded during the preceding hour, or some other elapsed time period.

At block 204, the data mining system 122 aggregates the set of metric values obtained at the block 202 for the segment period to determine an aggregated value, or real value, for the segment period. Aggregating the set of metric values can include averaging the set of metric values, summing the set of metric values, determining the modal value for the set of metric values, determining the highest or lowest value for the set of metric values, or any other method for combining the set of metric values or for selecting a representative value from the set of metric values. In some embodiments, the block 204 is optional. For example, the block 204 may be optional when the set of metric values includes a single data point.

At block 206, the data mining system 122 determines a point in time associated with the aggregated value. This time point may be the middle of the segment period, the end of the segment period, the beginning of the segment period, or any other time point associated with the segment period. The metric predictor 124 calculates a future time point based, at least in part, on the segment period and/or the length of time of the segment period at block 208. In certain embodiments, the future time point refers to a time segment rather than a specific point in time. In some cases, the future time point may refer to a segment of time that includes the point in time identified at the block 206. For example, suppose that the time point calculated in the block 206 is 10:30 am on a Sunday. Further, suppose that the process 200 is using a 24 hour time period with one hour long segment periods. In this example, at the block 208, the metric predictor 124 may calculate or select a future time point of 10:00-11:00 am, which can include some or all values collected between the hours of 10:00 and 11:00.

In some embodiments, the future time point may be the next period of time subsequent to the segment period or it may be some other time point subsequent to the segment period. For example, supposing that the segment period is of length one hour and that the segment period is between 13:00 and 14:00, the future time point may be the segment period between 14:00 and 15:00 of the same day, or it may be between 17:00 and 18:00 of the same day or any later date. Further, if the point in time for the aggregated value determined at the block 206 is 13:30, the future time point calculated may be 14:30 or 17:30 in the previous example.

At block 210, the metric predictor 124 predicts a value of the metric for the future point in time using a prediction algorithm to obtain a predicted value for the metric. The prediction algorithm can include any type of algorithm for predicting a future value based on past events or past data. For example, the prediction algorithm can include a least square linear regression algorithm, a Theil-Sen estimator, or a prediction based on averages.

Some or all of the five processes described with respect to the blocks 202-210 are repeated at block 212 for a number of alternative segment period lengths. A user (e.g., an administrator) may select one or more of the segment period length for the segment period used at the block 202, the number of alternative segment periods, and the length of the alternative segment periods. Alternatively, the segment period length, the number of alternative segment periods, and the length of the alternative segment periods may be determined based on the metric or a set of default configurations.

For example, suppose that the system evaluator 120 has access to one month (e.g., 30-days) of data for a given metric. This data may be obtained by, for example, the data mining system 122 accessing the database 116. The metric predictor 124 may predict the value for the metric for a subsequent month (e.g., next month, the same month the following year, etc.) using, for example, three time periods. One time period may be a day, one time period may be a week, and one time period may be a month. The time periods may each have different segment period lengths or a different number of segment periods. The metric predictor 124 may predict a value for the metric for each time period using the aggregated data of the segments for each time period.

At block 214, the time resolution ranking system 126 ranks each of the predictions for the different time periods using a ranking algorithm. The ranking may be based on a comparison between the predicted value and the actual value at a given point in time. Further, the ranking algorithm can include any type of algorithm for ranking different prediction window sizes based on a comparison of the predicted value to a real or actual value. For example, the ranking algorithm can be based on a linear correlation algorithm or a prediction interval validation algorithm. In some cases, a noise filtering algorithm may be used to determine whether to remove noise to improve prediction quality. As described in greater detail with respect to FIGS. 11 and 12, noise removal can involve removal of values determined to be noise and/or segments determined to be noise.

At block 216, the system evaluator 120 outputs the highest ranked prediction for the metric as determined at the block 214. In some embodiments, the system evaluator 120 may output the predictions for each of the time periods used to generate a ranking along with the ranking for the prediction. In other embodiments, the system evaluator 120 only outputs the highest ranked prediction. Outputting the prediction can include presenting the prediction at a client of a user (e.g. an administrator) or sending an alert to the user (e.g., an email, text message, instant message, voice mail, etc.).

Example of an Overall Prediction Process

Figure 2B:
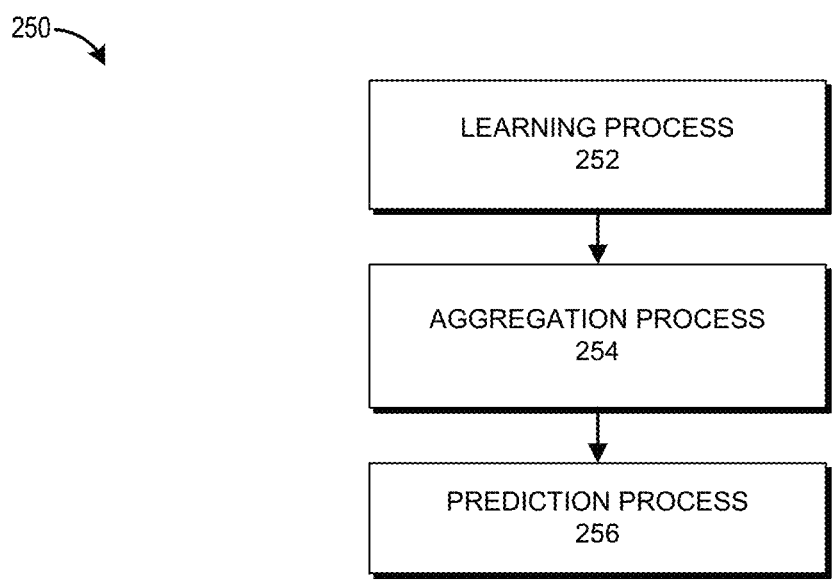
FIG. 2B illustrates a flowchart of an embodiment of an overall prediction process 250.

FIG. 2B illustrates a flowchart of an embodiment of an overall prediction process 250. The process 250 and, more particularly, each process depicted as part of the process 250, can be implemented, at least in part, by any system that can identify one or more period combinations, or segment periods, and rank them for a particular metric. For example, the process 250, in whole or in part, can be implemented by the system evaluator 120, the data mining system 122, the metric predictor 124, and the time resolution ranking system 126. Although any number of systems, in whole or in part, can implement the process 250, to simplify discussion, portions of the process 250 will be described with reference to particular systems.

The overall process 250 includes a learning process 252, an aggregation process 254, and a prediction process 256. It should be appreciated that, although the learning process 252, the aggregation process 254, and the prediction process 256 are illustrated sequentially, no particular order of performance is meant to be implied. Rather, the learning process 252, the aggregation process 254, and prediction process 256 can each be performed independently, for example, at random intervals, predetermined intervals, on-demand, responsive to certain criteria being met, etc.

The learning process 252 is generally a process that uses historical values of a metric to identify a prediction configuration that is deemed to best characterize the metric. The learning process 252 can determine what best characterizes the metric, for example, by scoring and ranking a set of prediction configurations. The set of prediction configurations can include, for example, period combinations, prediction algorithms, and/or the like. In various embodiments, the learning process 252 may be performed with respect to a plurality of metrics and thereby result in a prediction configuration being identified for each metric. Examples of the learning process 252 and of particular aspects of the learning process 252 will be described with respect to FIGS. 4A-6 and FIGS. 9-10. In various embodiments, the learning process can be performed at regular intervals (e.g., daily).

The aggregation process 254 is generally a process that updates historical values of metrics based on new historical values obtained. The aggregation process 254 may be performed, for example, in between executions of the learning process 252 (e.g., every three hours). The aggregation process 254 can involve aggregating the new historical values, for example, into a period combination that has been deemed to best characterize the metric in a most recent run of the learning process 252. As a result, when, for example, the prediction process 256 is executed, more recent data can be relied upon to compute predictions. An example of the aggregation process 254 will described with respect to FIG. 7.

The prediction process 256 is generally a process that computes predictions of future values of metrics based on historical values of the metrics and any prediction configurations identified during the learning process 252. The prediction process 256 may be performed, for example, on-demand, at regular intervals (e.g., for reporting or alerting purposes), and/or the like. An example of the prediction process 256 and of particular aspects of the prediction process 256 will be described with respect to FIGS. 8-9.

Example of a Period Combination

Figure 3:
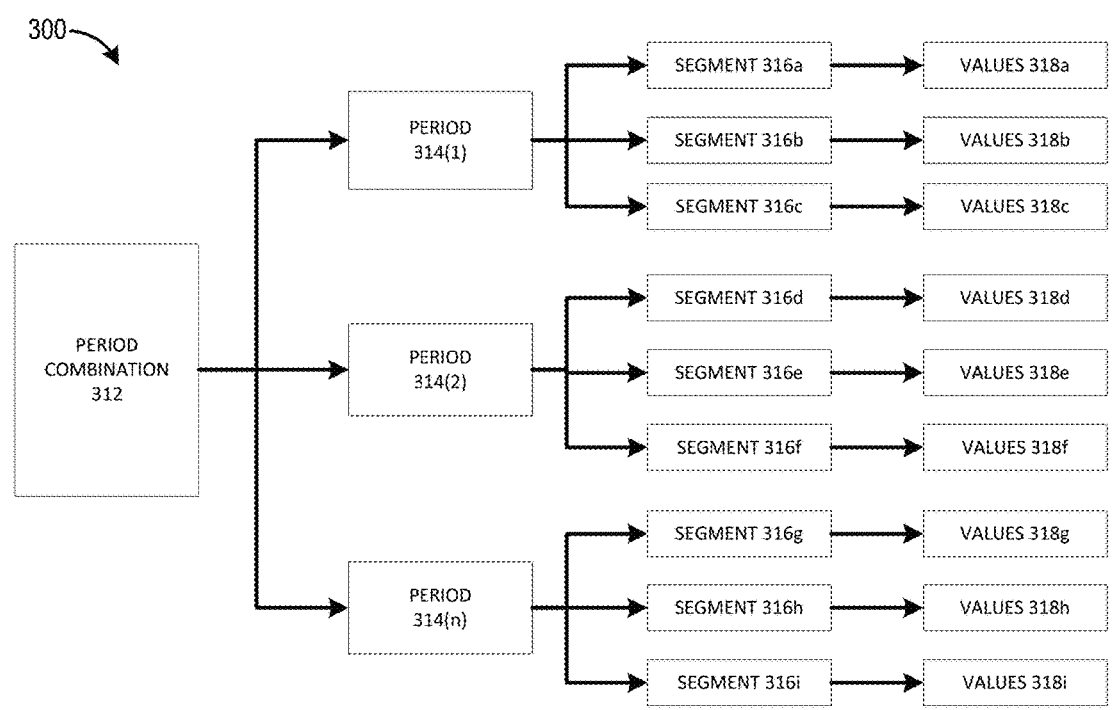
FIG. 3 illustrates an example of a structure of a period combination.

FIG. 3 illustrates an example of a structure 300 of a period combination 312. The period combination 312 is shown to include three periods, i.e., a period 314(1), a period 314(2), and a period 314(n) (collectively, period combinations 314). The period combinations 314 each include three segments selected from among segments 316a-316i (collectively, segments 316). Each segment of the segments 316 includes corresponding values from among values 318a-318i (collectively, values 318) that pertain to that segment. It should be appreciated that the depicted quantities of the periods 314 and the segments 316 are only for illustrative purposes. The periods 314 and segments 316 can include any number of periods and segments, respectively.

Examples of a Learning Process

Figure 4A:
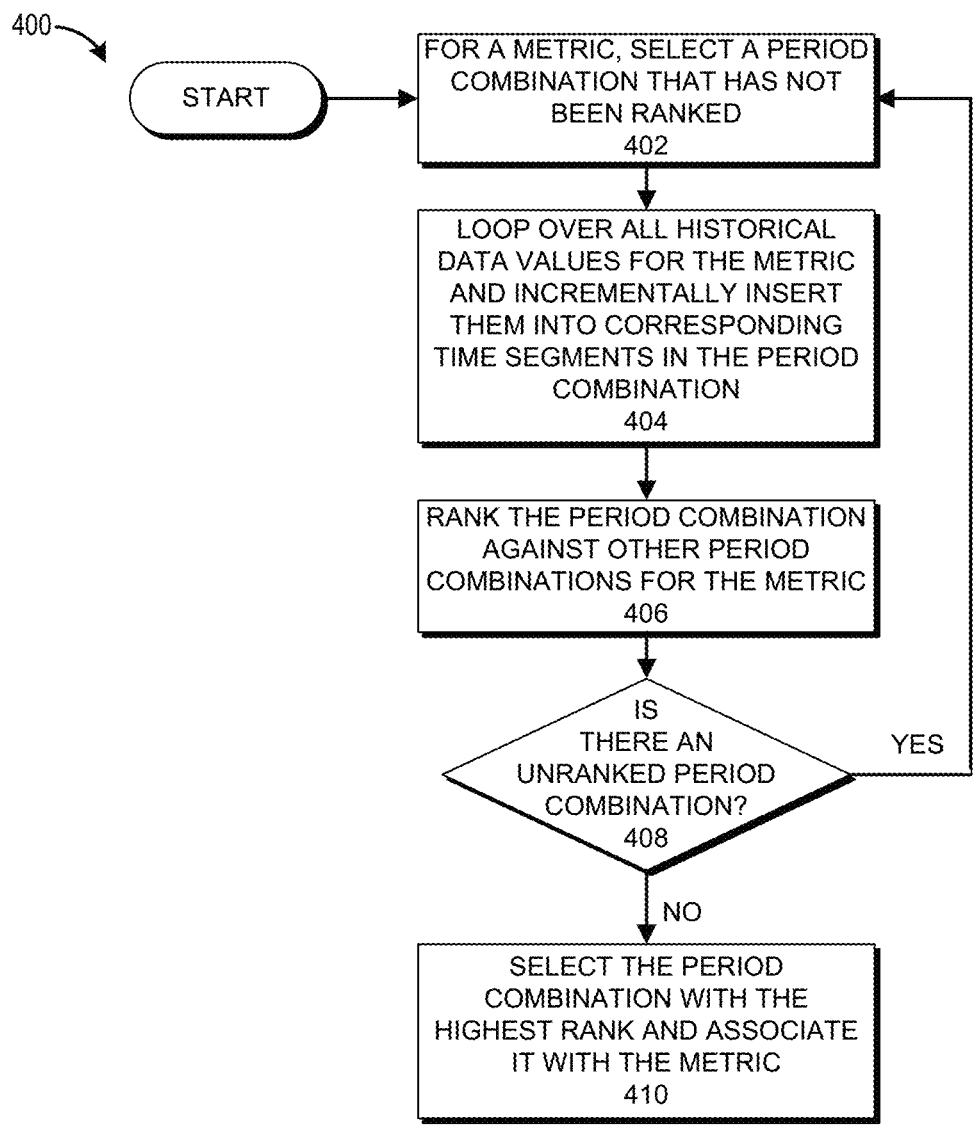
FIG. 4A illustrates a flowchart of an embodiment of a learning process.

FIG. 4A illustrates a flowchart of an embodiment of a learning process 400. The process 400 may be performed, for example, as part of the learning process 252 of FIG. 2. The process 400 can be implemented, at least in part, by any system that can identify one or more period combinations, or segment periods, and rank them for a particular metric. For example, the process 400, in whole or in part, can be implemented by the system evaluator 120, the data mining system 122, the metric predictor 124, and the time resolution ranking system 126. Although any number of systems, in whole or in part, can implement the process 400, to simplify discussion, portions of the process 400 will be described with reference to particular systems.

The process 400 begins at block 402 where, for example, the time resolution ranking system 126 selects, for a metric, a period combination that has not been ranked from a set of period combinations. As previously described, the metric can include any type of resource or characteristics associated with one or more computing systems and/or networks. The period combination can include any combination of time periods and segmentations thereof. For example, the period combination can include a working day divided into 24 segments of one-hour each, a weekend divided into 24 segments of two-hours each, a weekend divided into 48 segments of one-hour each, a week divided into 42 segments of four-hours each, etc.

The data mining system 122 loops over some or all of the historic data values for the metric and incrementally inserts them into corresponding time segments in the period combination at block 404. Generally, the corresponding time segment can include the time segment during which the data was measured. The block 404 can include aggregating data associated with one time segment and storing it at a point in time associated with the time segment, such as the middle, beginning, or end of the time segment. For example, if time segments are one-hour long, data that was measured between 9:00 and 10:00 may be aggregated and stored at a storage location associated with 9:30. Aggregation can involve any algorithm for combining data or determining a statistical value for the data, such as averaging the data, summing the data, determining a median value, or determining a modal value. The block 404 can also include computing a predicted value for the corresponding time segment. An example of the block 404 will be described in greater detail with respect to FIG. 5.

At block 406, the time resolution ranking system 126 ranks the period combination against other period combinations for the metric. For the first period combination evaluated, block 406 may be optional, or the period combination may be considered the highest ranked time resolution, at least until additional period combinations are evaluated. Ranking the period combinations can be based on one or more ranking algorithms, such as a linear correlation algorithm or a prediction interval validation algorithm. In some cases, the ranking at block 406 is between the highest previously ranked period combination and the period combination selected at the block 402. In some embodiments, ranking the period combinations can involve calculating the combination of data over each of the period combinations and then comparing the average error of each to the real value for the period combination at one or more time periods. Examples of the block 406 will be described with respect to FIGS. 6 and 10.

At decision block 408, the time resolution ranking system 126 determines whether there is an unranked period combination. If so, the process 400 returns to the block 402 and repeats the process 400 for another period combination that has not been ranked. If there are no unranked period combinations, the time resolution ranking system 126 selects the period combination with the highest rank and associates it with the metric at block 410. In some embodiments, the time resolution ranking system 126 may select more than one period combination to associate with the metric, such as selecting the top two or three period combinations.

The process 400 may be performed during specified intervals. For example, the process 400 may automatically be performed each night or once a week. In other cases, the process 400 may occur in response to a user command. In some embodiments, the process 400 may be used to identify characteristics of the metric, such as the period combination that best characterizes the change in value of the metric over time.

Figure 4B:
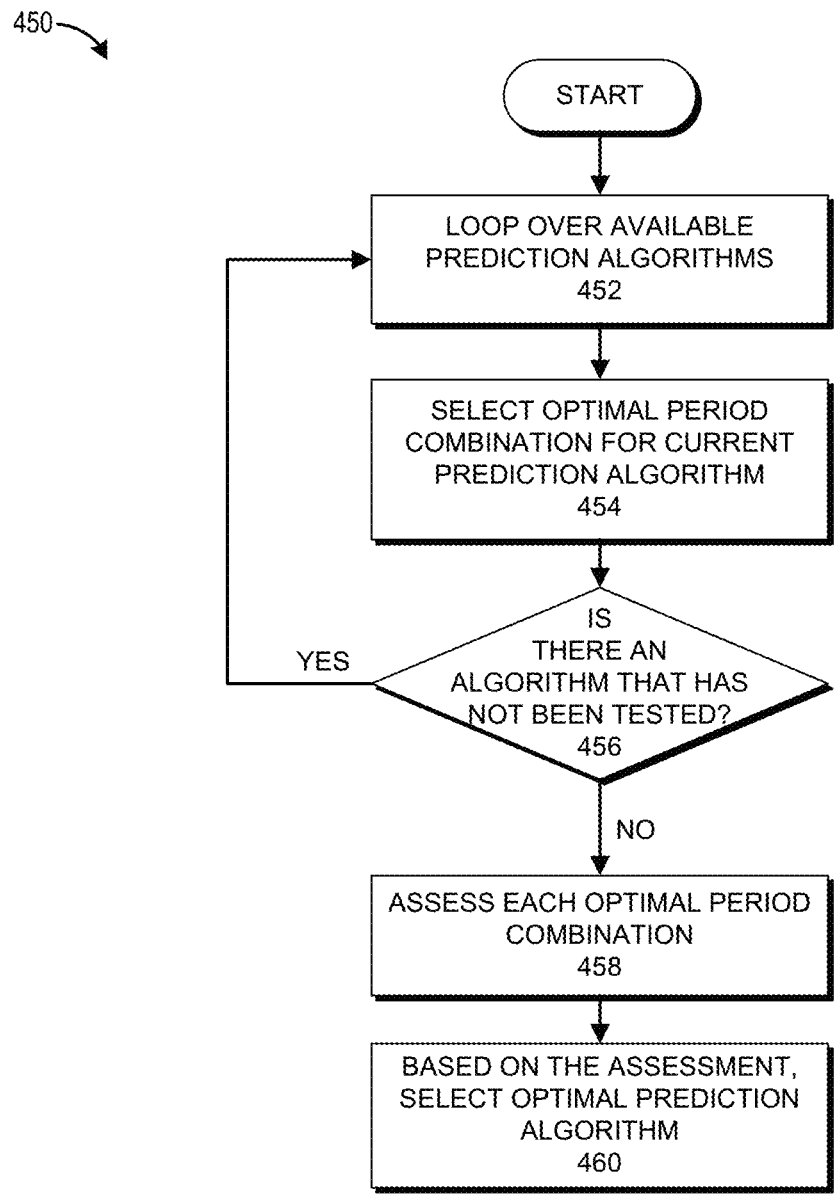
FIG. 4B illustrates a flowchart of an embodiment of a learning process.

FIG. 4B illustrates a flowchart of an embodiment of a learning process 450. The process 450 may be performed, for example, as part of the learning process 252 of FIG. 2. In various embodiments, the process 450 may be performed as an alternative to the process 400. The process 450 can be implemented, at least in part, by any system that can identify one or more period combinations, or segment periods, and rank them for a particular metric. For example, the process 450, in whole or in part, can be implemented by the system evaluator 120, the data mining system 122, the metric predictor 124, and the time resolution ranking system 126. Although any number of systems, in whole or in part, can implement the process 450, to simplify discussion, portions of the process 450 will be described with reference to particular systems.

The process 450 begins at block 452 where, for example, the system evaluator 120 loops over some or all of a set of prediction algorithms that are potentially applicable to a metric of interest. The set of prediction algorithms can include, for example, a least square linear regression algorithm, a Theil-Sen estimator, a prediction based on averages, exponential prediction algorithms, and/or the like. Examples of prediction algorithms will be described below and with respect to FIG. 9. At block 454, the system evaluator 120 selects an optimal period combination for a current prediction algorithm. For example, at the block 454, the system evaluator 120 can perform a process similar to the process 400, where the highest-ranked period combination is considered the optimal period combination for the prediction algorithm. As mentioned above with respect to the process 400, the block 454 can result in the optimal period combination having a set of predicted values that correspond to a set of historical values of the metric of interest.

At decision block 456, the system evaluator 120 determines whether there is another prediction algorithm in the set that has not been tested. If so, the process 450 returns to the block 452 and repeats the process 450 for another prediction algorithm that has not been tested. The process 450 typically continues until all prediction algorithms in the set have been tested. If there are no prediction algorithms that have not been tested, at block 458, the system evaluator 120 assesses each optimal period combination that was selected, for example, during an iteration of the block 454. For instance, the assessment can include assessing, for each optimal period combination, an accuracy of the set of predicted values relative to the set of historical values. Various methodologies of measuring accuracy, reliability, and/or the like can be utilized. For example, in some embodiments, the assessment can include calculating, for each optimal period combination, an error measurement such as, for example, a mean absolute average error, a mean absolute scaled error, a mean squared error, and/or the like. In some embodiments, the error measurement can focus on a certain range of the predicted values such as, for example, a second half thereof.

At block 460, based on the assessment at the block 458, the system evaluator 120 selects an optimal prediction algorithm in the set of prediction algorithms. The optimal prediction algorithm can be, for example, the prediction algorithm that has the lowest error measurement. In a typical embodiment, selection of the optimal prediction algorithm also constitutes selection of the optimal period combination for that prediction algorithm. In this fashion, the optimal prediction algorithm and its optimal period combination can serve as the basis for computing predictions as will be described in greater detail with respect to FIGS. 8-9.

Figure 5:
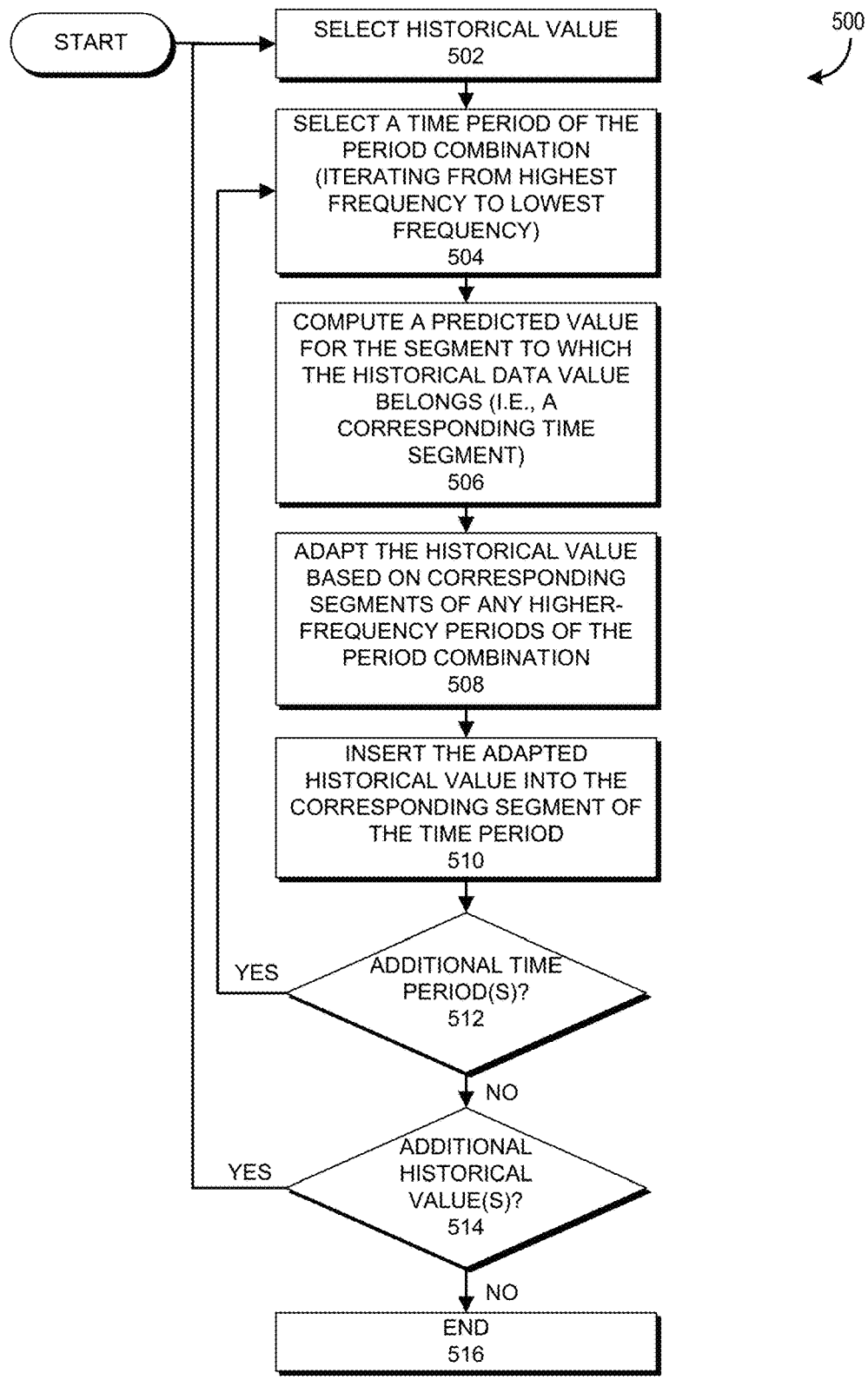
FIG. 5 illustrates a flowchart of an embodiment of a process for incrementally inserting historical data values into a period combination.

FIG. 5 illustrates a flowchart of an embodiment of a process 500 for incrementally inserting historical data values into a period combination. The process 500 may be performed, for example, as part of the block 404 of FIG. 4A. The process 500 can be implemented, at least in part, by any system that can identify one or more period combinations, or segment periods, and rank them for a particular metric. For example, the process 500, in whole or in part, can be implemented by the system evaluator 120, the data mining system 122, the metric predictor 124, and the time resolution ranking system 126. Although any number of systems, in whole or in part, can implement the process 500, to simplify discussion, portions of the process 500 will be described with reference to particular systems.

At block 502, the data mining system 122 selects a historical value from a set of historical values. At block 504, the data mining system 122 selects a time period of the period combination. In a typical embodiment, when selecting the time period, the data mining system 122 iterates from highest-frequency periods to lowest-frequency periods. For example, if the period combination were to include periods of day, week, and month, the day period would be the highest-frequency period and the month period would be the lowest-frequency period.

At block 506, the data mining system 122 computes a predicted value for a corresponding time segment of the selected period, where the corresponding time segment is the segment to which the historical value belongs. For example, if the selected period were the day period, the selected period had at a time resolution of one hour, and the historical value were from a time point of 12:01 am, then the data mining system 122 would compute a predicted value for a first one-hour segment of the day period. The predicted value may be based on, for example, all available historical values from the corresponding time segment. An example of algorithms and methodologies for computing the predicted value will be described below and with respect to FIG. 9.

At block 508, the data mining system 122 adapts the historical value based on corresponding segments of any higher-frequency periods of the period combination. Equation 1 below depicts an example of how an adapted historical value ($A_n$) for the selected period can be calculated. In Equation 1, H represents the historical value and n represents the selected period's frequency position in the period combination. For example, in embodiments where a lower value of n means a higher-frequency period, n could equal zero for the highest-frequency period (e.g., "day" in a day-week-month period combination), n could equal one for the next highest-frequency period (e.g., "week" in a day-week-month period combination), etc.

$$A_n = \begin{cases} H & n = 0 \\ A_{n-1} - P_{n-1} & n > 0 \end{cases} \qquad \text{Equation 1}$$

For a first iteration of the block 508 (i.e., when n equals zero), the adapted historical value ($A_n$) can be considered to equal the historical value (H). Because the process 500 generally iterates from highest frequency to lowest frequency as described above, it should be appreciated that, during the first iteration, the selected period combination is the highest frequency period in the period combination. Otherwise, when n is greater than zero, it can generally be assumed that the period combination has at least one higher-frequency period than the selected period. Therefore, it should be appreciated that blocks 504-510 will have previously executed with respect to each such period. According to this example, the immediately prior iteration through blocks 504-510 will have been respect to the period at frequency position n−1 (i.e., the period that is just above the selected period in terms of frequency). Thus, $A_{n-1}$ represents the adapted historical value that was computed at block 508 of the immediately prior iteration. Similarly, $P_{n-1}$ represents the predicted value computed at block 506 of the immediately prior iteration. In this fashion, $A_n$ can be computed as a difference between $A_{n-1}$ and $P_{n-1}$.

For example, consider Table 1 below where, for purposes of example, the period combination is assumed to include periods of day, week, and month and the historical value is assumed to equal fifty. According to this example, the day period, as the highest-frequency period, has an adapted historical value equal to the historical value (i.e. fifty). Further, the week period has an adapted historical value equal to the difference between the day period's adapted historical value and the day period's predicted value (i.e., forty). Finally, the month period has an adapted historical value equal to the difference between the week period's adapted historical value and the week period's predicted value (i.e., twenty-five).

TABLE 1

| Period | Adapted Historical Value | Predicted Value |
| --- | --- | --- |
| Day | 50 | 10 |
| Week | 40 | 15 |
| Month | 25 | N/A |

At block 510, the adapted historical value is inserted into the corresponding segment of the selected period. At decision block 512, the data mining system 122 determines whether there are any additional periods of the period combination through which, relative to the historical value selected at the block 502, the process 500 has not iterated. If so, the process 500 returns to the block 504 for selection of another period. If it is determined at the decision block 512 that there are not any additional periods of the period combination through which the process 500 has not iterated, at block 514, the data mining system 122 determines whether there are any additional historical values through which the process 500 has not iterated. If so, the process 500 returns to the block 502 for selection of another historical value (and the value of n described above can be considered reset, e.g., to zero). Otherwise, the process 500 proceeds to block 516 and ends.

In various embodiments, insertion of adapted historical values in an incremental fashion as described above has numerous advantages. For example, such insertion can have the effect of filtering from lower-frequency periods information that belongs to higher-frequency periods. For example, if the metric of interest is processor utilization, the historical value may be influenced by whether its point in time is on the first day of the week, the first day of the month, the first few hours of the workday, and/or the like. An example of the incremental effect of inserting adapted historical values will now be described with reference to Table 1 above.

As shown in Table 1, the adapted historical value for the day period, as the highest-frequency period, includes all information from the exemplary historical value. Differently, however, the adapted historical value for the week period filters the information that is presumed to be representative of "expected" activity during the corresponding segment of the day period. In certain embodiments, the predicted value for the day period can be used as a measure of such "expected" activity. Therefore, as described above, the filtering can be accomplished by subtracting the predicted value for the day period from the adapted historical value for the day period. Consequently, the adapted historical value for the week period can be considered to include any "new" information over and above what is deemed to be "expected" for the day period at that time.

In similar fashion, the adapted historical value for the month period further filters the information that is presumed to be representative of "expected" activity during the corresponding segment of the week period. In like manner to that described above, the predicted value for the week period can be used as a measure of "expected" activity during the week period. Thus, the adapted historical value for the month period can be computed (and filtered) by subtracting the predicted value for the week period from the adapted historical value for the week period. As a result, the adapted historical value for the month period can be considered to include any "new" information over and above what is deemed to be "expected" for the day period at that time and over and above what is deemed to be "expected" for the week period at that time.

Figure 6:
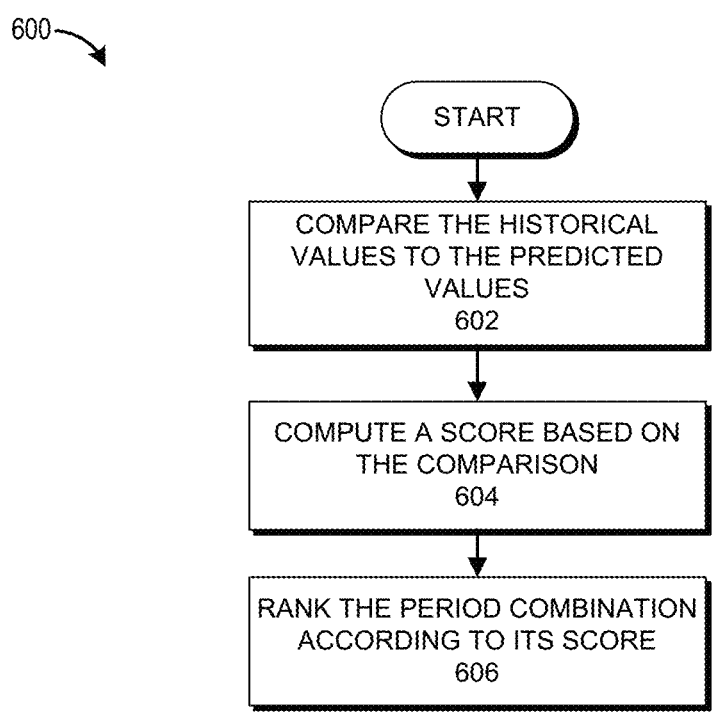
FIG. 6 illustrates a flowchart of an embodiment of a process for ranking a period combination relative to a metric.

FIG. 6 illustrates a flowchart of an embodiment of a process 600 for ranking a period combination relative to a metric. The process 600 may be performed, for example, as part of the block 406 of FIG. 4A. In addition, the process 600 may be performed, for example, subsequent to the process 500 of FIG. 5 The process 600 can be implemented, at least in part, by any system that can identify one or more period combinations, or segment periods, and rank them for a particular metric. For example, the process 600, in whole or in part, can be implemented by the system evaluator 120, the data mining system 122, the metric predictor 124, and the time resolution ranking system 126. Although any number of systems, in whole or in part, can implement the process 600, to simplify discussion, portions of the process 600 will be described with reference to particular systems.

At block 602, the time resolution ranking system 126 compares a set of historical values to a set of predicted values. The set of predicted values may be, for example, a cumulative result of the block 506 of FIG. 5. The comparison can include utilizing various analytical algorithms such as, for example, a linear correlation algorithm, a prediction interval validation algorithm, and/or the like. At block 604, the time resolution ranking system 126 computes a score based on the comparison. For example, the score can mathematically manipulate a result of the analytical algorithms utilized at the block 602. At block 606, the time resolution ranking system 126 ranks the period combination according to its score. The period combination may be given a rank relative to other period combinations, for example, by ranking all period combinations from highest score to lowest score (or vice versa). A specific example of the process 600 will be described with respect to FIG. 10.

Example of an Aggregation Process

Figure 7:
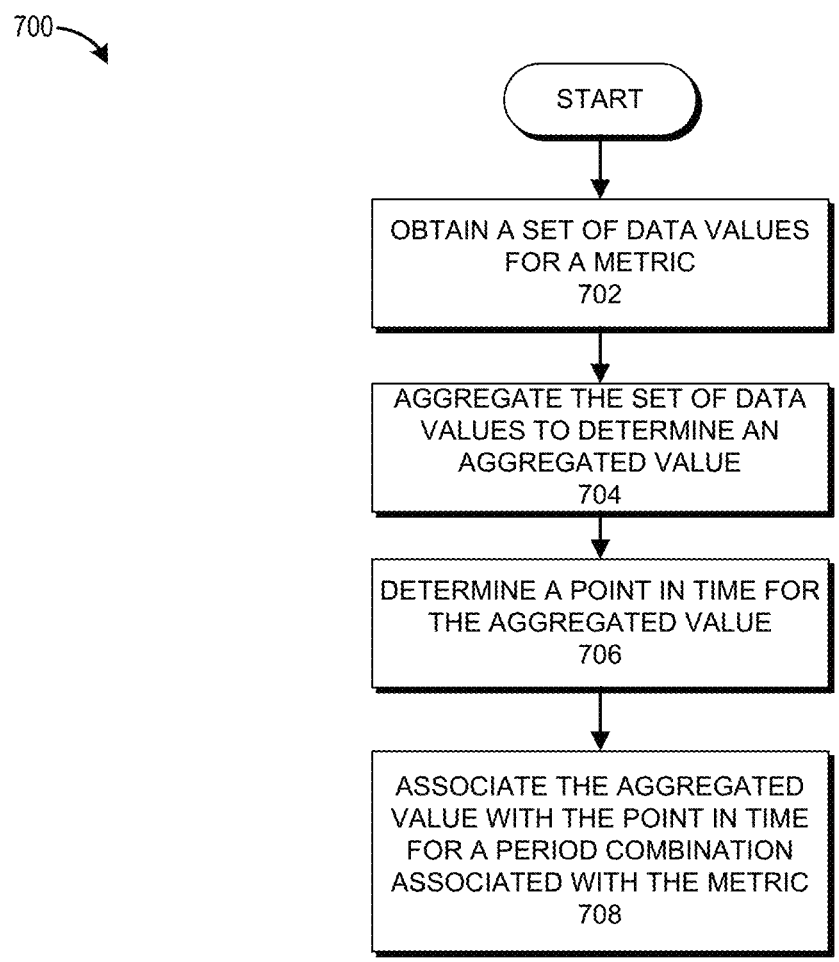
FIG. 7 illustrates a flowchart of an embodiment of an aggregation process.

FIG. 7 illustrates a flowchart of an embodiment of an aggregation process 700. The process 700 can be implemented, at least in part, by any system that can collect data and aggregate it with historical data, or previously collected data, for a selected period combination, such as that selected by the process 700. For example, the process 700, in whole or in part, can be implemented by the system evaluator 120, the data mining system 122, the metric predictor 124, and the time resolution ranking system 126. Although any number of systems, in whole or in part, can implement the process 700, to simplify discussion, portions of the process 700 will be described with reference to particular systems.

The process 700 begins at block 702 where, for example, the data mining system 122 obtains a set of data values for a metric. This data may be obtained by accessing one or more computing systems (e.g., the clients 110, servers 112, network 114, etc.) to determine the data and/or by accessing data collected and stored on the database 116. At block 704, the data mining system 122 aggregates the set of data values to determine an aggregated value. Aggregating the set of data values can include determining one or more statistical and/or mathematical values associated with the data, such as the average, the standard deviation, the mode, the median, the summation, etc.

The data mining system 122 determines a point in time for the aggregated value at block 706. This point in time can include any time within a time segment that the data used to generate the aggregated value was collected from, during which the measurement of the data originally occurred, or during the event that caused the data to be generated. For example, if the data was collected over a one hour period, the point in time can be the beginning of the hour, the end of the hour, the middle of the hour, or any other point within the hour. In some embodiments, more than one point in time may be determined for a period combination. Further, in some cases, one or more points in time may be determined for each period combination in a set of period combinations associated with the aggregated value.

At block 708, the data mining system 122 associates the aggregated value with the point in time for a period combination associated with the metric. For example, the data mining system 122 can incrementally insert the aggregated value into a corresponding segment of each period of the period combination as described with respect to the process 500 of FIG. 5. In some cases, the block 708 may involve associating the aggregated value with a point in time for more than one period combination.

In some embodiments, the process 700 can be used to determine the curve or picture of how data associated with a metric changes over time, or even if the data does change over time instead of maintaining a steady state.

The process 700 may be performed during specified intervals. For example, the process 700 may automatically be performed each night or once a week. In other cases, the process 700 may occur in response to a user command. In some cases, the process 700 may occur every hour or every few hours. Typically, although not necessarily, the process 700 may run more frequently than the process 700 and may consume less computing resources to perform. In some embodiments, the more frequently the process 700 is performed the more data that may be available to facilitate predicting a future metric value and, as a result, the more accurate the prediction may be. An example of predicting a metric value is described in more detail below with respect to FIG. 8.

Example of a Prediction Process

Figure 8:
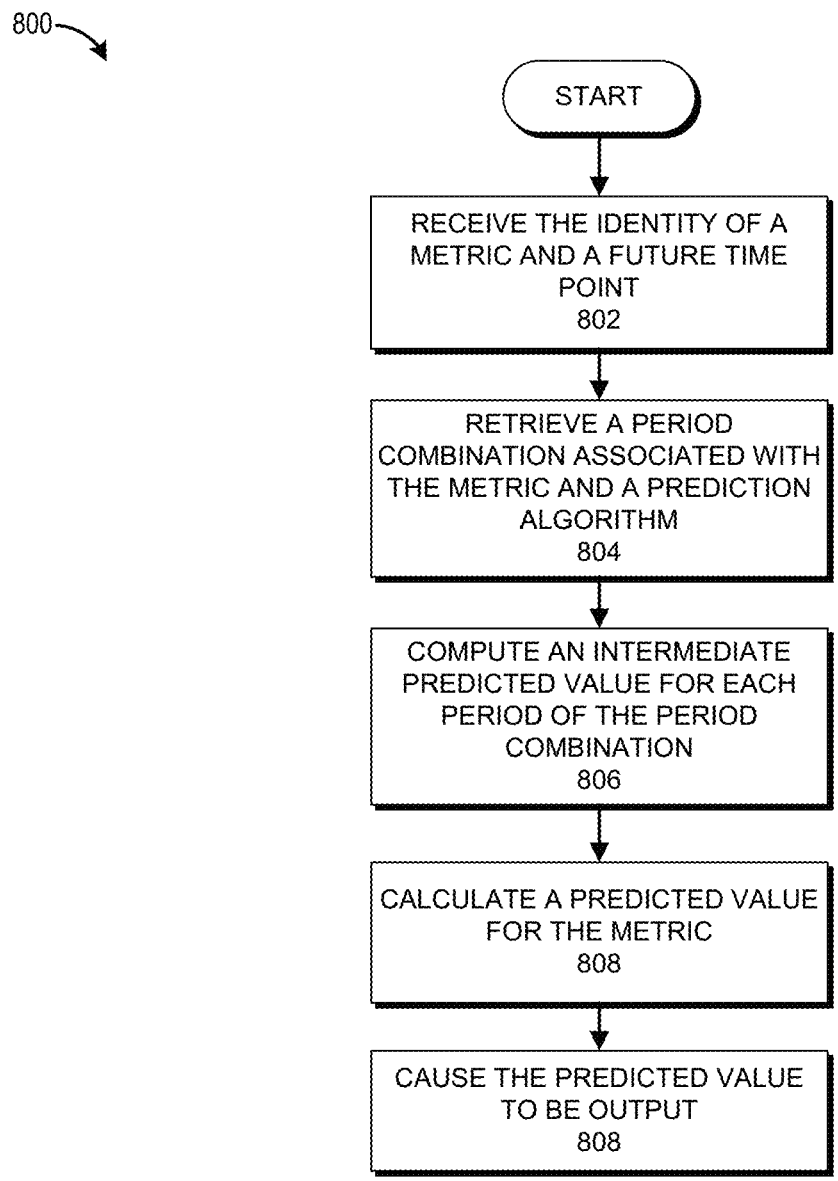
FIG. 8 illustrates a flowchart of an embodiment of a prediction process.

FIG. 8 illustrates a flowchart of an embodiment of a prediction process 800. The process 800 can be implemented, at least in part, by any system that can predict a value for a metric. For example, the process 800, in whole or in part, can be implemented by the system evaluator 120, the data mining system 122, the metric predictor 124, and the time resolution ranking system 126. Although any number of systems, in whole or in part, can implement the process 800, to simplify discussion, portions of the process 800 will be described with reference to particular systems.

The process 800 begins at block 802 where, for example, the metric predictor 124 receives the identity of a metric and a future time point. The identity of the metric can be for any metric that a user or application is attempting to obtain a prediction for a future value thereof. The future time point can include one or more points in time in the future for which the user or application is attempting to determine or estimate the value of the metric. For example, the metric may be CPU utilization, hard disk utilization, network bandwidth, etc., and the future time point can be the following week, month, year, etc. from the point in time that the block 802 is performed. In some cases, the block 802 may include receiving a set of percentile thresholds for facilitating determining a future metric value. For instance, the percentile thresholds may be used to identify whether a metric indicates more resources will be required when the future time point is reached.

At block 804, the metric predictor 124 retrieves a period combination associated with the metric and/or a prediction algorithm. In some embodiments, the period combination and the prediction algorithm were previously selected as a pair and associated with the metric during a learning process such as, for example, the learning process 450 of FIG. 4B. In still other embodiments, only the period combination may have been associated with the metric during the learning process (e.g., the learning process 400 of FIG. 4A). In these embodiments, the prediction algorithm may be preset, dynamically selected, and/or the like. For example, the prediction algorithm can be dynamically selected at the time of prediction based on criteria such as, for example, error measurement as described with respect to FIG. 4B.

At block 806, the metric predictor 124 uses the prediction algorithm to compute an intermediate predicted value for each period of the period combination. As described above with respect to FIGS. 3 and 5, the period combination generally includes one or more periods (e.g., hour, day, week, month, etc.). Therefore, the future time point will generally have a corresponding segment in each of the one or more periods (e.g., the segment covering a range of time in which the future time point falls). Thus, for each period, the intermediate predicted value can be computed based on historical values that were inserted into the corresponding segment during, for example, a process such as the process 500 of FIG. 5 and/or aggregated during a process such as the process 700 of FIG. 7. An example of how the prediction algorithm can be applied will be described with respect to FIG. 9.

At block 808, the metric predictor 124 calculates a predicted value for the metric from the intermediate predicted values. Generally, as described with respect FIGS. 5 and 7, each period of the period combination has had historical values inserted therein in an incremental fashion from highest-frequency period to lowest-frequency period. Therefore, each intermediate predicted value can be considered to have "new" information relative to the metric. The predicted value can be calculated by mathematically manipulating the intermediate predicted values. For example, in certain embodiments, the predicted value can be a sum of the intermediate predicted values.

An example of the block 808 will now be described with respect to Table 2 below. Table 2 illustrates exemplary intermediate predicted values for an exemplary period combination that includes periods of day, week, and month. As shown, the day period is the highest-frequency period and has an intermediate predicted value of forty based on its corresponding segment for the future time point. The intermediate predicted value for the week period indicates that, based on the segment of the week period in which the future time point falls, there is a predicted increase of five over what would otherwise be expected for the day period. Further, the intermediate predicted value for the month period indicates that, based on the segment of the month period in which the future time point falls, there is a predicted increase of twenty over what would otherwise be expected for the day period and the month period. Therefore, an exemplary predicted value for the metric could be sum of the intermediate predicted values (i.e., sixty-five).

TABLE 2

| Period | Intermediate Predicted Value |
|---|---|
| Day | 40 |
| Week | 5 |
| Month | 20 |

At block 810, the metric predictor causes the predicted value to be output. This value may be presented to a user or provided to an application that, in some cases, can alert the user based on whether the predicted value satisfies one or more rules. This value may also be used for reporting purposes. In some cases, outputting the predicted value can include outputting the percentile of resource consumption that will occur at the future time point.

Examples of Prediction Algorithms

Examples of prediction algorithms that can be used in certain embodiments will now be described. For example, the prediction algorithms described here can be used during certain functional blocks described above including, but not limited to, the block 210 of FIG. 2A, the block 506 of FIG. 5, and the block 806 of FIG. 8. In various embodiments, a prediction algorithm can be a particular prediction formula, a combination of prediction formulas, and/or the like. For purposes of illustration, linear prediction formulas will be described. It should be appreciated that exponential prediction formulas can also be utilized without deviating from the principles described herein.

Equation 2 is an example of a linear formula that can be utilized to calculate a predicted value ($y_p$) of a metric for a future time point ($x_p$). The predicted value ($y_p$) can be, for example, an intermediate predicted value as described with respect to FIG. 8. Equations 3-5 illustrate exemplary formulas that can be used to supply values for a slope (i.e., a) and a y-intercept (i.e., b). For purposes of convenience, in various embodiments, all points in time (including future time points) may be expressed in terms of system time. For example, according to UNIX time, each point in time could be expressed as a difference, measured in milliseconds, between the point in time and midnight, Jan. 1, 1970 Coordinated Universal Time (UTC).

$$y_p = ax_p + b \qquad \text{Equation 2}$$

In general, Equations 3-5 operate with respect to a set of historical values (y) and a set of points in time (x). Therefore, a given historical value ($y_i$) generally relates to a point in time ($x_i$). The variable n, for purposes of Equations 3-5, corresponds to a number of values in the set of historical values. The set of historical values are typically those values that have been inserted or aggregated into a given segment of a given time period.

Equation 3 below is an example of least square linear regression.

$$a = \frac{n\sum_{i=1}^{n} x_i y_i - \sum_{i=1}^{n} x_i \sum_{i=1}^{n} y_i}{n\sum_{i=1}^{n} x_i^2 - \left[\sum_{i=1}^{n} x_i\right]^2} \qquad \text{Equation 3}$$

$$b = \frac{n\sum_{i=1}^{n} y_i - a\sum_{i=1}^{n} x_i}{n}$$

Equation 4 below is an example of a Theil-Sen estimator.

$$a = \text{median}\left\{\frac{y_i - y_j}{x_i - x_j} : x_i \neq x_j, i < j = 1, \ldots, n\right\} \qquad \text{Equation 4}$$

$$b = \text{median}\{y_i - ax_i : i = 1, \ldots, n\}$$

Equation 5 below is an example of a formula for performing predictions based on averages.

$$a = 0 \qquad \text{Equation 5}$$

$$b = \frac{\sum_{i=1}^{n} x_i}{n}$$

In various embodiments, each of Equations 3-5, when combined with Equation 2, is an example of a prediction algorithm that can be selected as described with respect to the process 450 of FIG. 4B and used to compute intermediate predicted values as described with respect to the process 800 of FIG. 8. In addition, in various embodiments, a prediction algorithm can combine one or more equations (such as Equations 3-5). For example, one or more other formulas may be used to support selection of a prediction algorithm at a time of prediction.

Figure 9:
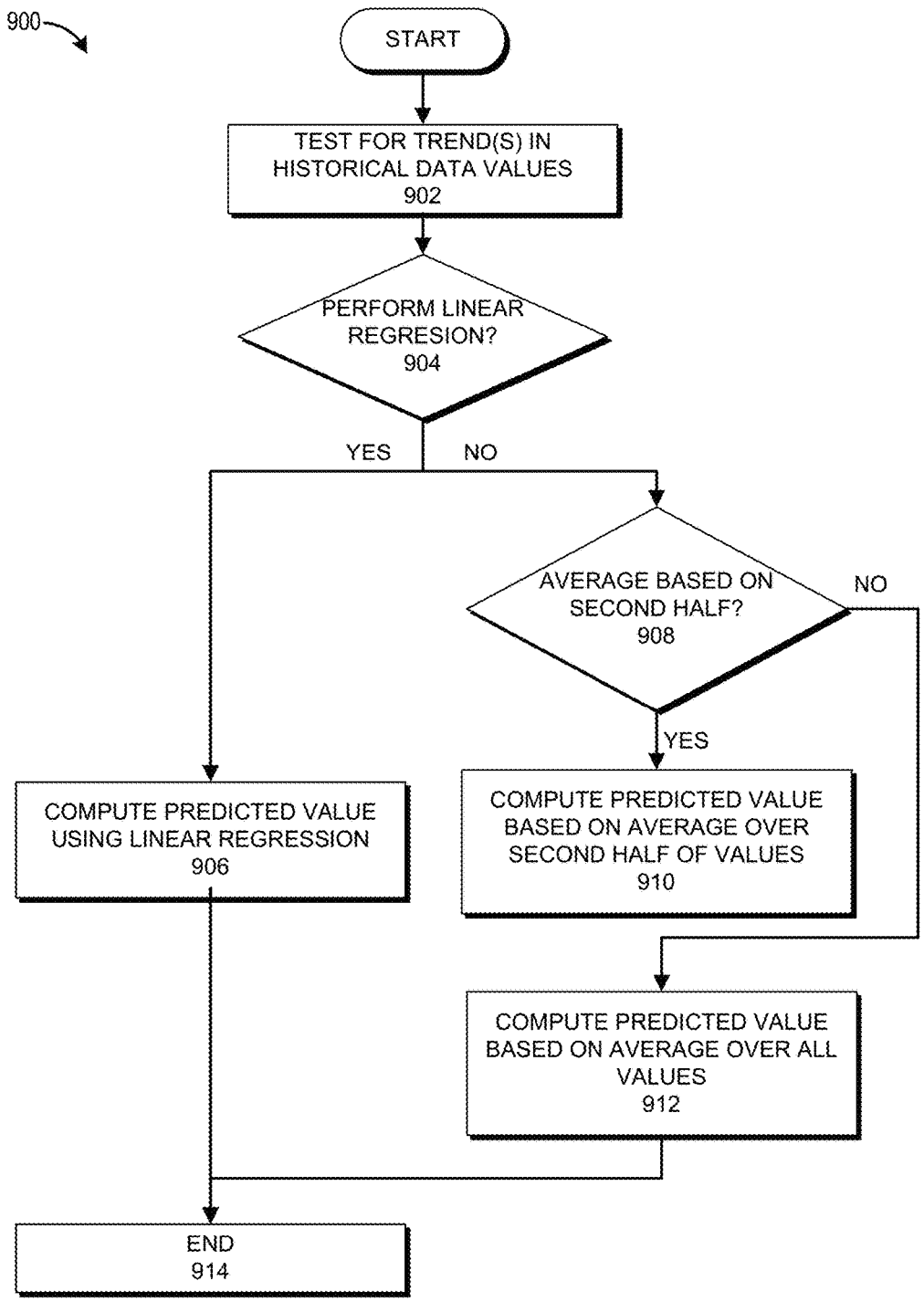
FIG. 9 illustrates a flowchart of an embodiment of a process for computing a predicted value.

FIG. 9 illustrates a flowchart of an embodiment of a process 900 for computing a predicted value. The predicted value can be, for example, an intermediate predicted value as described with respect to the block 806 of FIG. 8. In various embodiments, the process 900 can be performed as part of the block 806. The process 900 can be implemented, at least in part, by any system that can predict a value for a metric. For example, the process 900, in whole or in part, can be implemented by the system evaluator 120, the data mining system 122, the metric predictor 124, and the time resolution ranking system 126. Although any number of systems, in whole or in part, can implement the process 900, to simplify discussion, portions of the process 900 will be described with reference to particular systems.

At block 902, the metric predictor 124 tests for a trend in a set of n historical data values. The set of n historical values can be, for example, values from a corresponding segment of a period as described with respect to FIG. 5. In various embodiments, a Mann-Kendall test can be performed at the block 902.

An example of the Mann-Kendall test is shown in Equation 6 below. The set of n historical values is represented by y. As shown, an S-statistic (S) and a standard deviation ($\sigma_s$) for the S-statistic can be computed. Thereafter, a test statistic (Z) can be computed that measures a significance of trend. In various embodiments, multiple test statistics can be computed. For example, a test statistic ($Z_{ALL}$) could be computed for an entirety of the set of historical values and another test statistic ($Z_{2H}$) could be computed for a second half of the set of historical values (where the second half could be, for example, the second half relative to time, number of values, etc.).

$$S = \sum_{i=1}^{n-1} \sum_{j=i+1}^{n} \text{sign}(y_j - y_i) \qquad \text{Equation 6}$$

$$\text{sign}(y_j - y_i) = \begin{cases} 1 & (y_j - y_i) > 0 \\ 0 & (y_j - y_i) = 0 \\ -1 & (y_j - y_i) < 0 \end{cases}$$

$$\sigma_s = \sqrt{\frac{n(n-1)(2n+5)}{18}}$$

$$Z = \begin{cases} \frac{(S-1)}{\sigma_s} & S > 0 \\ 0 & S = 0 \\ \frac{(S+1)}{\sigma_s} & S < 0 \end{cases}$$

At decision block 904, the metric predictor 124 determines whether to perform linear regression (e.g., least square linear regression according to Equation 3). The determination can be based on configurable criteria such as, for example, values of $Z_{ALL}$ and $Z_{2H}$. For example, in various embodiments, if $Z_{ALL}$ is of at least a threshold value (e.g., greater than 2.4) and $Z_{2H}$ is of at least a threshold value (e.g., greater than or equal to 0.75), then the metric predictor 124 may determine to perform linear regression and proceed to block 906. At the block 906, the metric predictor 124 performs, for example, least square linear regression according to Equation 3 described above.

If it is determined at the decision block 904 to not perform linear regression, the metric predictor 124 proceeds to decision block 908. At this point, for purposes of this example, the metric predictor 124 has already determined to perform a prediction based on averages. At the decision block 908, the metric predictor 124 determines whether to perform the prediction based on averages, for example, for an entirety of the set of historical values or for only the second half of the set of historical values. As above, the determination can be based on configurable criteria such as, for example, values of $Z_{ALL}$ and $Z_{2H}$. For example, in various embodiments, if $Z_{ALL}$ is of at least a threshold value (e.g., greater than 2.4) and $Z_{2H}$ is less than a threshold value (e.g., less than 0.75), then the metric predictor 124 may determine to perform the prediction based on averages over only the second half of the set of historical values.

If it is determined at the decision block 908 to perform the prediction based on averages for only the second half of the set of historical values, the metric predictor 124 proceeds to block 910. At the block 910, the metric predictor 124 computes the predicted value based on an average over the second half of the set using, for example, Equation 5. If it is determined at the decision block 908 to not perform the prediction based on averages for only the second half of the set of historical values, the metric predictor 124 proceeds to block 912. At the block 912, the metric predictor 124 computes the predicted value based on the entirety of the set of historical values using, for example, Equation 5. At block 914, the process 900 ends.

In various embodiments, the process 900 may be considered an example of a prediction algorithm that can be selected as described, for example, with respect to the process 450 of FIG. 4B. In various other embodiments, the process 900 may be considered an example of how to apply a linear regression prediction algorithm such as, for example, least square linear regression as represented in Equation 3. In these embodiments, the process 900 can be used to ensure prediction quality by verifying trend(s) in the set of historical values. As noted above, if sufficient trend does not exist, a prediction based on averages may instead be conducted.

Examples of Ranking and Scoring Algorithms

Figure 10:
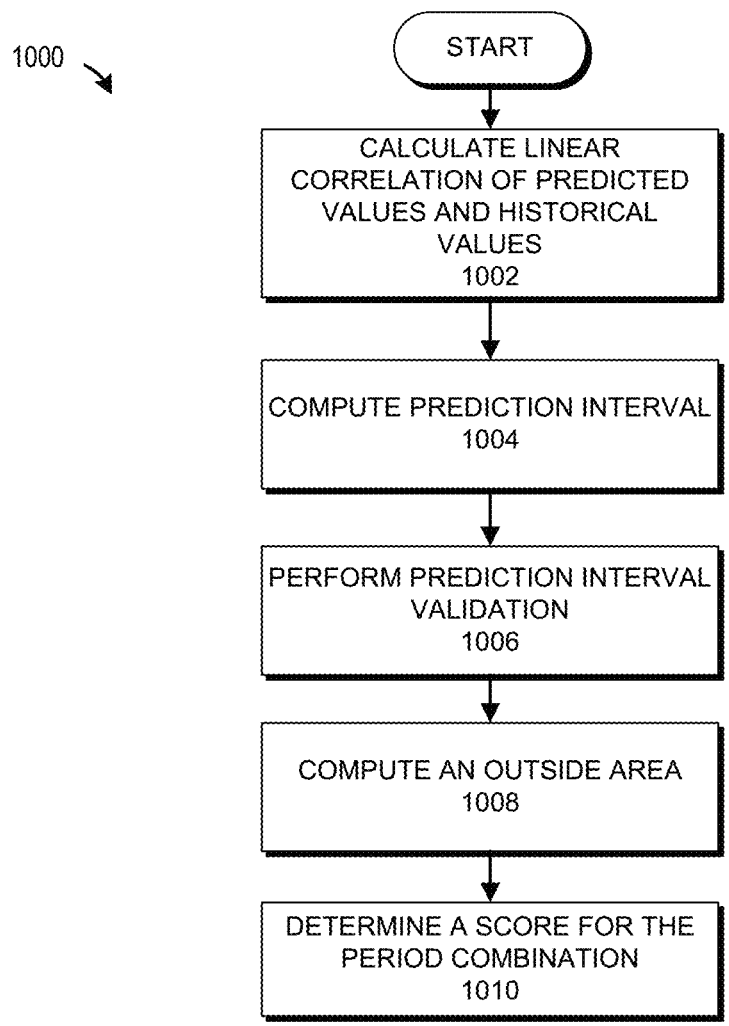
FIG. 10 illustrates a flowchart of an embodiment of a process for ranking a period combination relative to a metric.

FIG. 10 illustrates a flowchart of an embodiment of a process 1000 for ranking a period combination relative to a metric. The process 1000 may be performed, for example, as part of the block 406 of FIG. 4A. In typical embodiment, the process 1000 is a specific example of how the process 600 of FIG. 6 can be performed. Therefore, like the process 600, the process 1000 may be performed, for example, subsequent to the process 500 of FIG. 5.

The process 1000 can be implemented, at least in part, by any system that can identify one or more period combinations, or segment periods, and rank them for a particular metric. For example, the process 1000, in whole or in part, can be implemented by the system evaluator 120, the data mining system 122, the metric predictor 124, and the time resolution ranking system 126. Although any number of systems, in whole or in part, can implement the process 1000, to simplify discussion, portions of the process 1000 will be described with reference to particular systems.

At block 1002, the time resolution ranking system 126 calculates a linear correlation of a set of predicted values of the metric to a set of historical values of the metric. The set of predicted values may be, for example, a cumulative result of the block 506 of FIG. 5. Equation 7 below depicts an example of calculating the linear correlation (Lc) relative to the set of predicted values (x) and the set of historical values (y). Each predicted value ($x_i$) generally corresponds to and was previously calculated for the time point of a historical value ($y_i$) (e.g., at the block 506 of FIG. 5). In the context of Equation 7, the set of predicted values and the set of historical values each include n values. The linear correlation (Lc) can range from minus one to positive one, with a higher value indicating a better correlation.

$$Lc = \frac{n\sum_{i=1}^{n} x_i y_i - \sum_{i=1}^{n} x_i \sum_{i=1}^{n} y_i}{\sqrt{n\sum_{i=1}^{n} x_i^2 - \left(\sum_{i=1}^{n} x_i\right)^2} - \sqrt{n\sum_{i=1}^{n} y_i^2 - \left(\sum_{i=1}^{n} y_i\right)^2}}$$

Equation 7

At block 1004, the time resolution ranking system 126 computes a prediction interval. The prediction interval is an estimate of an interval in which future values are expected to reside with a certain desired probability. The prediction interval is usually of the form [l, u], where l is a lower bound and u is an upper bound. For example, in some embodiments, the time resolution ranking system 126 computes a sixty-percent prediction interval, such that twenty percent of future values would be expected to be lower than the lower bound and twenty percent of values would be expected to be higher than the upper bound. The prediction interval can be computed via numerous methods including, for example, non-parametric methods, various methods that assume a normal distribution, regression analysis, Bayesian statistical methods, and/or the like.

Equation 8 below is an example of how a prediction interval (I) can be computed as a sixty-percent prediction interval. In Equation 8, each $x_i$ refers to a particular value in the set of historical values, $\bar{x}$ refers to a mean value of the set, n is a number of values in the set, and σ is a standard deviation of the set (e.g., computed as shown in Equation 8). For purposes of this example, normal distribution of the set of historical values with respect to the mean value ($\bar{x}$) is assumed. As shown, based on these assumptions, $p_{20}$ and $p_{80}$ (i.e., upper and lower bounds of I) can be computed as 0.85 standard deviations below the mean value ($\bar{x}$) and 0.85 standard deviations above the mean value ($\bar{x}$), respectively. It should be appreciated that Equation 8 can be configured to any desired prediction interval by substituting 0.85 with any appropriate number(s) of standard deviations from the mean value ($\bar{x}$).

$$\sigma = \sqrt{\frac{1}{n-1}\sum_{i=1}^{n}(x_i - \bar{x})^2}$$

$$p_{20} = \bar{x} - 0.85\sigma$$

$$p_{80} = \bar{x} + 0.85\sigma$$

$$I = [p_{20}, p_{80}]$$

Equation 8

At block 1006, the time resolution ranking system 126 performs prediction interval validation. Continuing the above example of the sixty-percent prediction interval, as shown in Equation 9, the time resolution ranking system 126 can compute a validation value (V), where R is a number of historical values in the set of historical values that fall within the prediction interval and n is the number values in the set. For prediction intervals of other than sixty percent, Equation 9 could be modified to replace 0.6 with a decimal value of the appropriate percentage.

$$V = \text{Minimum}\left(1, \frac{R}{0.6n}\right)$$

Equation 9

At block 1008, the time resolution ranking system 126 computes an outside area. In typical embodiment, the outside area serves to lower a score of algorithms that have a tendency to predict values that are, for example, significantly greater than corresponding historical values. Equation 10 is an example of how to calculate the outside area (A) relative to the set of predicted values (x) and the set of historical values (y). Each predicted value ($x_i$) generally corresponds to and was previously calculated for the time point of a historical value ($y_i$) (e.g., at the block 506 of FIG. 5). In the context of Equation 10, the set of predicted values and the set of historical values each include n values. If, for example, each predicted value equals its corresponding historical value, the outside area (A) generally equals minus one.

$$A = -\frac{\sum_{i=1}^{n} x_i^2 + \sum_{i=1}^{n} y_i^2 - \sum_{i=1}^{n} x_i y_i}{n \sum_{i=1}^{n} y_i^2} \quad \text{Equation 10}$$

At block 1010, the time resolution ranking system 126 computes a score for the period combination. In a typical embodiment, the score can be a sum, for example, of Lc, V, and A as computed at the blocks 1002, 1006, and 1008, respectively. As described above with respect to the process 400 of FIG. 4A, the process 450 of FIG. 4B, and the process 600 of FIG. 6, the score can serve as the basis for ranking period combinations.

Examples of Noise Filtering

Figure 11:
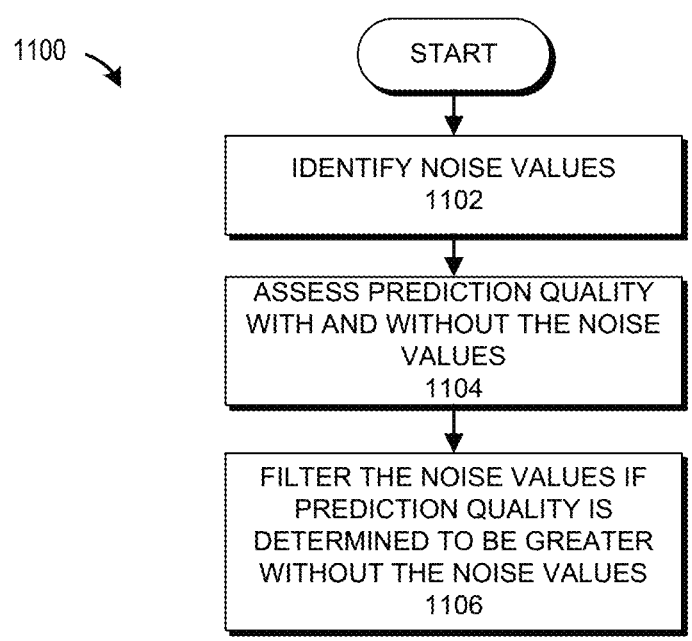
FIG. 11 illustrates a flowchart of an embodiment of a process for performing noise filtering of values.
Figure 12:
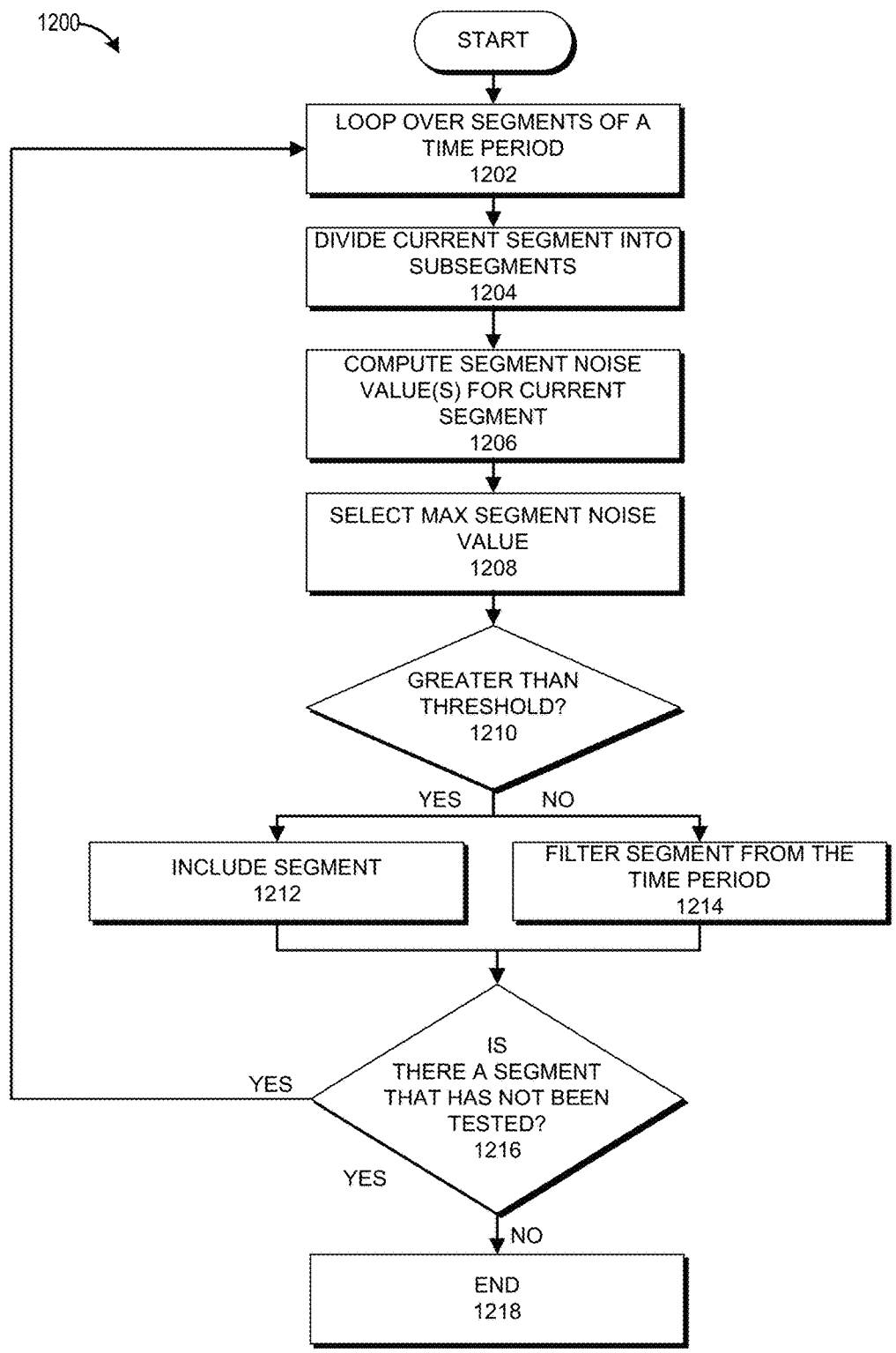
FIG. 12 illustrates a flowchart of an embodiment of a process for performing noise filtering of segments.

FIGS. 11-12 describe examples of performing noise filtering. In particular, FIG. 11 provides an example of filtering values that are determined to be noise. FIG. 12 provides an example of filtering segments that are determined to be noise. It should be appreciated that the respective processes described with respect to FIGS. 11-12 can be performed at any point of the processes described above.

FIG. 11 illustrates a flowchart of an embodiment of a process 1100 for performing noise filtering of values. The process 1100 can be implemented, at least in part, by any system that can identify and assess values of metrics. For example, the process 1100, in whole or in part, can be implemented by the system evaluator 120, the data mining system 122, the metric predictor 124, and the time resolution ranking system 126. Although any number of systems, in whole or in part, can implement the process 1100, to simplify discussion, portions of the process 1100 will be described with reference to particular systems.

At block 1102, the time resolution ranking system 126 identifies noise values in a set of historical values of a metric. Various standards of what constitutes noise can be established. For example, in certain embodiments, a given historical value may be considered noise if: (1) the value is higher than ninety-five percent of historical values in the set and is more than twenty percent greater than a mean value of the set; or (2) the value is lower than ninety-five percent of historical values in the set and is less than eighty percent of the mean value of the set. At block 1104, the time resolution ranking system 126 assesses prediction quality with and without the noise values.

Equation 11 provides an example of a formula for computing a prediction quality (Q), where n is the number of values in a set to which the equation is being applied and σ-represents a standard deviation of such set. For purposes of this example, normal distribution is assumed. For a given value in the set, $p_{80i}$ and $p_{20i}$ are values at an 80th percentile and a 20th percentile, respectively, for the segment to which the given value belongs. Similarly, $\bar{x}_i$ and $\sigma_i$ and are a mean value and a standard deviation, respectively, of the segment to which the given value belongs.

$$Q = \frac{\sum_{i=1}^{n}(p_{80i} - p_{20i})}{\sigma\sqrt{(n-1)}} \quad \text{Equation 11}$$

$$p_{20i} = \bar{x}_i - 0.85\sigma_i$$

$$p_{80i} = \bar{x}_i + 0.85\sigma_i$$

Based on the assumption of normal distribution, each $p_{20i}$ and $p_{80i}$ can be computed, for example, as 0.85 standard deviations below the mean value ($\bar{x}_i$) and 0.85 standard deviations above the mean value ($\bar{x}_i$), respectively. It should be appreciated that Equation 11 can be tuned to desired percentiles, for example, by substituting 0.85 with an appropriate number(s) of standard deviations from the mean value ($\bar{x}_i$). In various embodiments, the prediction quality Q is computed twice: once for the set of historical values with the noise values ($Q_{ALL}$) and once for the set of historical values without the noise values ($Q_{FILTERED}$).

At block 1106, the time resolution ranking system 126 filters the noise values if prediction quality is determined to be greater without the noise values. For example, depending on embodiment, the time resolution ranking system 126 can either prevent the noise values from being inserted into a corresponding segment of a given period or remove the noise values.

It should be appreciated that the process 1100 of FIG. 11 can be performed at various points of the processes described above. For example, the process 1100 can be performed as part of a learning process such as the learning process 252 of FIG. 2B. In these embodiments, the process 1100 can be performed, for example, subsequent to or during the process 400 of FIG. 4A, the process 450 of FIG. 4B, the process 500 of FIG. 5, the process 600 of FIG. 6, and/or the like. The process 1100 can be performed, for example, prior to or after scoring and ranking period combinations. In various embodiments, the process 1100 can also be performed as part of an aggregation process such as the aggregation process 254 of FIG. 2B or the process 700 of FIG. 7. In addition, the process 1100 can be performed prior to performing predictions as described, for example, with respect to the process 800 of FIG. 8 and the process 900 of FIG. 9.

FIG. 12 illustrates a flowchart of an embodiment of a process 1200 for performing noise filtering of segments. The process 1200 may be performed, for example, subsequent to or during the process 400 of FIG. 4A, the process 450 of FIG. 4B, the process 500 of FIG. 5, the process 700 of FIG. 7, the process 800 of FIG. 8, the process 900 of FIG. 9, and/or the process 1000 of FIG. 10. The process 1200 can be implemented, at least in part, by any system that can identify and assess values of metrics. For example, the process 1200, in whole or in part, can be implemented by the system evaluator 120, the data mining system 122, the metric predictor 124, and the time resolution ranking system 126. Although any number of systems, in whole or in part, can implement the process 1200, to simplify discussion, portions of the process 1200 will be described with reference to particular systems.

The process 1200 begins at block 1202 where, for example, the time resolution ranking system 126 loops over segments of a time period of a period combination. Each segment contains values (potentially in adapted form) of a metric of interest. In general, an objective of the process 200 is to determine, for each segment of the time period, whether the segment is noise that should not be considered when performing predictions. In a typical embodiment, the time period is a period other than the highest-frequency period of the period combination. The time period may be, for example, a lowest-frequency period of the period combination. For example, in various embodiments, the process 1200 can be performed with respect to a month period whenever a month period occurs in a period combination. Additionally, performance of the process 900 can be conditioned on a particular prediction algorithm that is utilized. For example, in some embodiments, the process 1200 may only be performed with respect to period combinations that are used to perform predictions using linear regression, the process 900 of FIG. 9, and/or the like.

At block 1204, the time resolution ranking system 126 divides a current segment of the time period into subsegments. In various embodiments, each instance of the time period for which the current segment contains one or more values can be a subsegment. For example, if the time period is a month period, each unique month for which the current segment contains values can be considered a subsegment. Consider an example such that the current segment corresponds to a six-hour segment of [12:00-18:00] on the eighteenth day of the month period. If the current segment includes historical values from May 18, 2012, Jun. 18, 2012, and Jul. 18, 2012, then each of May 18, 2012, Jun. 18, 2012, and Jul. 18, 2012 could be a subsegment (S1, S2, and S3, respectively). Each such subsegment could include values of the metric of interest that were collected, for example, on an hourly basis.

At block 1206, the time resolution ranking system 126 computes one or more segment noise values for the current segment. Equation 12 provides an example of computing a segment noise value (t) using a two-sample test. The two-sample test utilizes a first sample and a second sample. The two samples are generally two subsegments selected from the current segment. According to Equation 12, $\mu_1$ is a mean value of the first sample, $\sigma_1$ is a standard deviation of the first sample, and $n_1$ is a number of values in the first sample. In similar fashion, $\mu_2$ is a mean value of the second sample, $\sigma_2$ is a standard deviation of the second sample, and $n_2$ is a number of values in the second sample. In a typical embodiment, a segment noise value (t) is computed for each potential pairing of one subsegment with another subsegment. For instance, continuing the above example of S1, S2, and S3, three potential pairings are possible: S1-S2, S1-S3, and S2-S3. Therefore, three segment noise values t1, t2, and t3 could be computed.

$$t = \left| \frac{\mu_1 - \mu_2}{\sqrt{\frac{\sigma_1^2}{n_1} + \frac{\sigma_2^2}{n_2}}} \right| \qquad \text{Equation 12}$$

At block 1208, the time resolution ranking system 126 selects a maximum segment noise value as computed at block 1206. For instance, in the case of three segment noise values as described above, the maximum segment noise value could equal a highest value among t1, t2, and t3. At block 1210, the time resolution ranking system 126 determines whether the maximum segment noise value is greater than a configurable threshold (e.g., 1.2). If so, at block 1212, the current segment is allowed to be included in the time period. If it is determined at the block 1210 that the maximum segment noise value is not greater than the configurable threshold, the process 1200 proceeds to block 1214.

At the block 1214, the time resolution ranking system 126 filters the current segment from inclusion in the time period. In a typical embodiment, filtering the current segment involves ensuring that the current segment is not considered when performing a prediction using the period combination. What constitutes filtering can vary based on, for example, when the filtering is performed. For example, filtering can involve flagging the current segment as filtered, removing any values already inserted within the current segment, not inserting any values into the segment if no values have yet been inserted, including a single value of zero within the current segment, excluding the current segment from a current prediction, etc.

At block 1216, the time resolution ranking system 126 determines whether there is a segment of the time period that has not been tested. If so, the process 1200 returns to the block 1202 and repeats the process 1200 for another segment of the time period. If not, the process 1200 proceeds to block 1218. At the block 1218, the process 1200 ends.

It should be appreciated that the process 1200 of FIG. 12 can be performed at various points of the processes described above. For example, the process 1200 can be performed as part of a learning process such as the learning process 252 of FIG. 2B. In these embodiments, the process 1200 can be performed, for example, subsequent to or during the process 400 of FIG. 4A, the process 450 of FIG. 4B, the process 500 of FIG. 5, the process 600 of FIG. 6, and/or the like. The process 1200 can be performed, for example, prior to or after scoring and ranking period combinations. In various embodiments, the process 1200 can also be performed as part of an aggregation process such as the aggregation process 254 of FIG. 2B or the process 700 of FIG. 7. In addition, the process 1200 can be performed prior to performing predictions as described, for example, with respect to the process 800 of FIG. 8 and the process 900 of FIG. 9.

II. Application Scaling Systems and Processes

In various embodiments, the systems and processes described supra with respect to FIGS. 1-12 can be utilized to proactively scale software applications that execute in a clustered computing environment. The clustered computing environment can be, for example, a cloud computing environment that shares compute resources among a plurality of software applications. As one of ordinary skill in the art will appreciate, each software application may be provisioned a quantity of the shared compute resources. In various embodiments, the quantity can take the form of a number of machine instances, physical or virtual, that are allocated to the software application. For purposes of this disclosure, a machine instance is a specified hardware configuration that includes, for example, a specified allocation of CPUs, RAM, storage, networking resources, and/or the like.

More particularly, data indicative of an application load of each of a plurality of software applications can be collected over time as described with respect to FIGS. 1-12. For purposes of this disclosure, an application load refers to any metric or composite of metrics that can be used to measure the performance of an application on a computing system. Some non-limiting examples of metrics that can be used measure application load include: memory utilization, processor utilization, operation completion rate, storage utilization, network bandwidth, and an end-user experience management metric (e.g., response time). In various embodiments, the systems and processes described supra with respect to FIGS. 1-12 can be utilized to generate, from the collected data, an application-behavior baseline for each software application. The application-behavior baseline typically specifies a future period of time (e.g., a one-day period) and includes a plurality of projected (i.e. predicted) application loads over the future period of time.

The application-behavior baseline can have a configurable time resolution. For example, for a given software application, the application-behavior baseline can include projected application loads at half-hour intervals, hourly intervals, two-hour intervals, etc. The methods described with respect to FIGS. 1-12 can be used to learn which period combination and/or prediction algorithm best characterizes the application load of each software application. In that way, each projected application load can be computed using a corresponding period combination and/or prediction algorithm as described supra.

For purposes of this disclosure, scaling refers to adjusting a quantity of compute resources that are allocated to a particular software application. Scaling can encompass, for example, scaling out, scaling in, scaling up, and/or scaling down. Scaling out refers to a process for redistributing a software application among one or more additional machine instances so that, in total, more physical resources are provisioned to the software application. Scaling in refers to a process for redistributing a software application among fewer machine instances so that, in total, fewer physical resources are provisioned to a given software application. Scaling up can include, for example, upgrading to a machine instance having a hardware configuration that is more powerful in at least one respect (e.g., memory, number or type of processors or cores, etc.). Scaling down can include, for example, downgrading to a machine instance having a hardware configuration that is less powerful in at least one respect.

For purposes of simplicity, examples of scaling are described with respect to software applications. However, in various embodiments, applications may be segmented into independently managed subunits. In these embodiments, resources such as, for example, machine instances, can be independently provisioned to each subunit of the software applications. In similar fashion, an application load can be collected, stored, and projected for each subunit of the software applications. For instance, in certain embodiments that utilize WINDOWS AZURE, the subunits may be known as role instances of the software applications. Therefore, although examples may be provided relative to software applications, each example is considered equally applicable to subunits of software applications that can be independently managed, monitored, and provisioned resources.

System Overview

Figure 13:
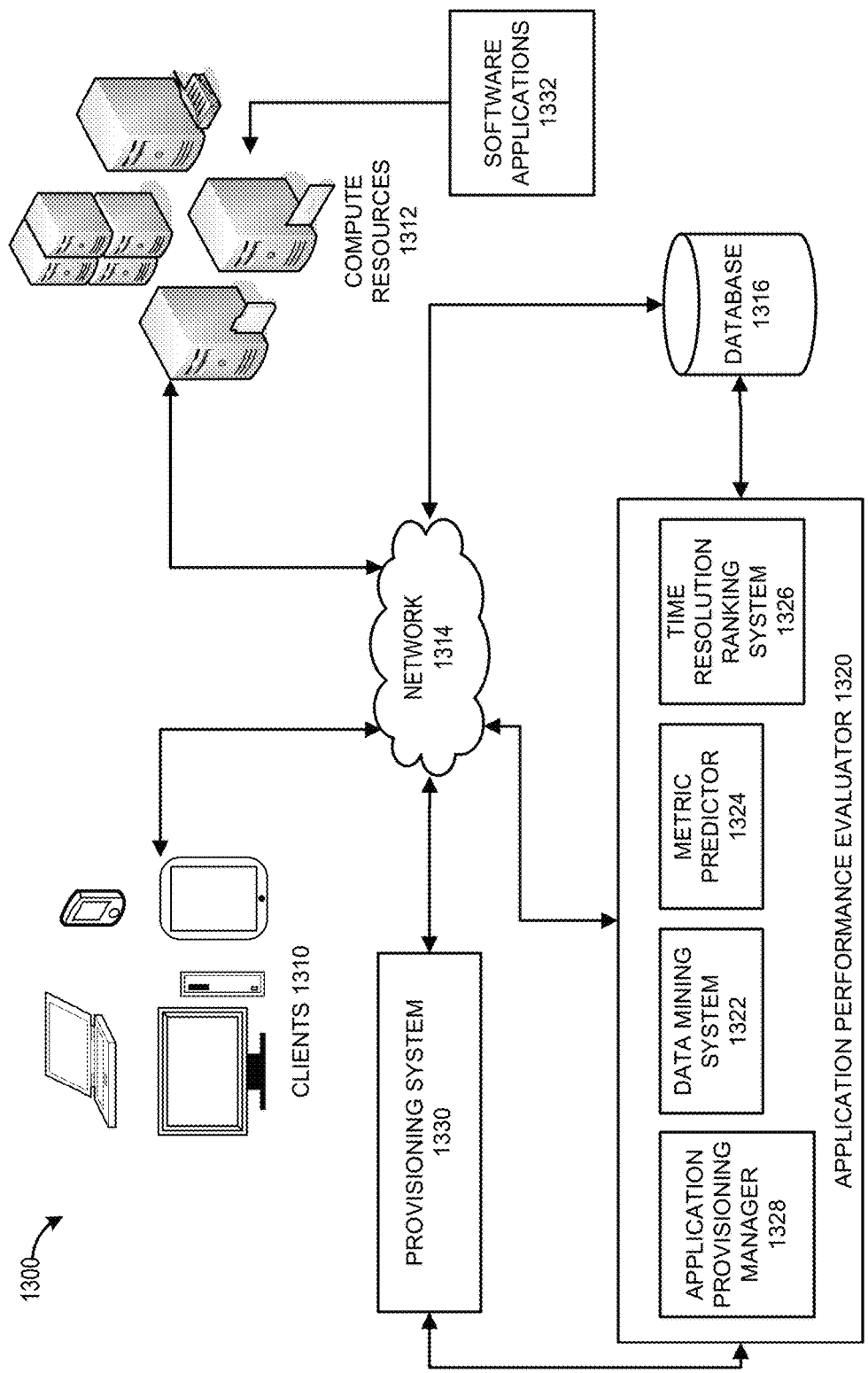
FIG. 13 is a block diagram of an embodiment of a clustered computing environment.

FIG. 13 is a block diagram of an embodiment of a clustered computing environment 1300 such as, for example, a cloud computing environment. The clustered computing environment 1300 is operable to share compute resources 1312 among a plurality of software applications 1332 executing thereon. The clustered computing environment 1300 includes, inter alia, an application performance evaluator 1320 and a provisioning system 1330.

In certain embodiments, the plurality of software applications 1332 can be hosted by the clustered computing environment 1300 for customers. The clustered computer environment 1300 may be responsible for complying with certain application performance criteria related to the execution of the plurality of software applications 1332. The performance criteria may be specified, for example, by a service level agreement (SLA). The performance criteria can vary, for example, by software application, customer, and/or the like. In some embodiments, the plurality of software applications 1332 can be distributed software applications that are managed at a subunit level as described above. For example, in WINDOWS AZURE implementations, the plurality of software applications 1332 can be managed as role instances.

The provisioning system 1330 manages the allocation of the compute resources 1312 to the plurality of software applications 1332. In typical embodiment, the provisioning system 1330 provisions the compute resources 1312 to the software applications 1332 as machine instances. The machine instances can be, for example, virtual or physical machine instances that each have a specified hardware configuration. For example, in the case of virtualized resources, the hardware configuration can specify CPUs, RAM, storage, and networking resources that will be provisioned.

The application performance evaluator 1320 generally includes all functionality described above with respect to the system evaluator 120 of FIG. 1. More particularly, however, the application performance evaluator 1320 is capable of analyzing historical values related to individual application loads of the software applications 1332. The application performance evaluator 1320 can then predict future application behavior and resource needs. Further, as described with respect to FIGS. 1-12, the application performance evaluator 1320 can analyze a number of time resolutions for evaluating the application load to determine the time resolution that is statistically likely to provide the most accurate prediction for a future value thereof. Advantageously, in certain embodiments, by evaluating multiple time resolutions, the application performance evaluator 1320 can more accurately make predictions of future behavior of the software applications 1332. As described in greater detail with respect to FIGS. 14-16, the application performance evaluator 1320 can enable proactive and/or reactive provisioning of the compute resources 1312 to the software applications 1332.

As illustrated in FIG. 13, the application performance evaluator 1320 can include an application provisioning manager 1328, a data mining system 1322, a metric predictor 1324, and a time resolution ranking system 1326. In addition, the application performance evaluator 1320 may be configured to communicate with a database 1316, either through a wired or wireless connection, or via the network 1314. Alternatively, in some cases, the application performance evaluator 1320 may include the database 1316. The application provisioning manager 1328 is operable to interact with the data mining system 1322, the metric predictor 1324, and the time resolution ranking system 1326 as described in greater detail below.

Using the data mining system 1322, the application provisioning manager 1328 can collect and/or access data relating to the application load of the plurality of software applications 1332. The data mining system 1322 may access the compute resources 1312 and/or the plurality of software applications 1332 directly or via the network 1314. Alternatively, or in addition, the data mining system 1322 may access the data relating to the application load by accessing the database 1316, which can be configured to store data collected from the compute resources 1312 and/or the plurality of software applications 1332. The database 1316 may obtain the data from the application performance evaluator 1320 (e.g., via the data mining system 1322), the data may be provided to the database 1316 by the compute resources 1312 (e.g., via a data agent associated with compute resources 1312) and/or the software applications 1332 (e.g., via instrumentation of the software applications 1332), or a data collector (not shown) may collect the data from the compute resources 1312 and/or the software applications 1332 for storage in the database 1316.

The metric predictor 1324 is configured, for one or more application-performance metrics, to analyze data related to the application load. Based, at least in part, on the analysis of the collected data, the metric predictor can predict a future value for the application load. The metric predictor 1324 can perform the process of predicting a future value for a metric using one or more different combinations or permutations of time periods and measurement segments (i.e., period combinations). As described above with respect to FIGS. 1-12, the measurement segments can generally include any time at which data is read or accessed, and/or aggregated from a series of data readings within a measurement segment.

Further, based at least in part on the analysis of data related to the application load, the metric predictor 1324 can predict or forecast a value for the application load at a point in time. In some cases, this prediction may be within a particular probability or threshold probability. Advantageously, in certain embodiments, by predicting a future value for the application load, the application performance evaluator 1320 can alert a user (e.g., an administrator) of the status of an organization's software applications (e.g., the software applications 1332) thereby enabling the user to reconfigure one or more computing systems and/or to increase/decrease an allocation of the compute resources 1312.

As previously mentioned, the metric predictor 1324 can analyze data over multiple permutations of time periods and measurement segments. The time resolution ranking system 1326 can rank the various permutations of time periods and measurement segments based on a number of factors including, for example, the metric being predicted, user preferences, and the accuracy of previous predictions.

The application provisioning manager 1328 can interact with the metric predictor 1324 to generate an application-performance baseline for an application. The application-behavior baseline can encompass predicted values of the application load over a future period of time such as, for example, a one-hour period, a four-hour period, an eight-hour period, a twenty-four hour period, and/or the like. The application-behavior baseline can have a configurable time resolution so that, for example, it can include a predicted value at half-hour intervals, hourly intervals, two-hour intervals, and/or the like. In addition, the application provisioning manager 1328 can determine, for a subperiod of a future period of time, a quantity of compute resources that are required to manage a given projected application load.

Examples of Proactive Scaling Processes

Figure 14A:
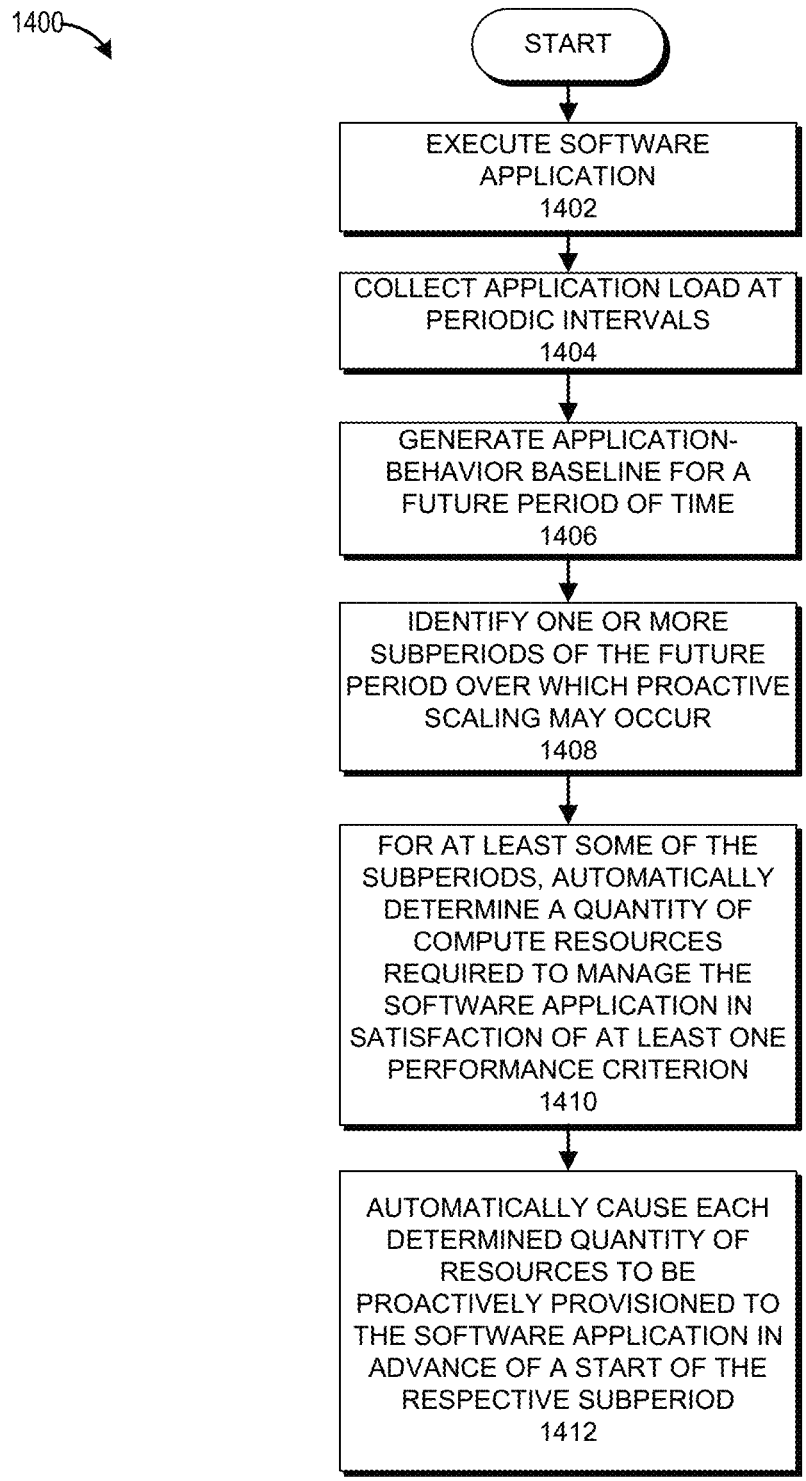
FIG. 14A illustrates a flowchart of an embodiment of a process for proactive scaling of a software application.

FIG. 14A illustrates a flowchart of an embodiment of a process 1400 for proactive scaling of a software application. For simplicity of description, the process 1400 is described with respect to a single software application. However, it should be appreciated that, in various embodiments, the process 1400 can be performed for each of a plurality of software applications such as, for example, the software applications 1332 of FIG. 13.

The process 1400 can be implemented, at least in part, by any system that can identify and assess values of metrics. For example, the process 1400, in whole or in part, can be implemented by the application performance evaluator 1320, the data mining system 1322, the metric predictor 1324, the time resolution ranking system 1326, the application provisioning manager 1328, and/or the provisioning system 1330. Although any number of systems, in whole or in part, can implement the process 1400, to simplify discussion, portions of the process 1400 will be described with reference to particular systems.

At block 1402, the clustered computing system 1300 executes the software application using, for example, the compute resources 1312. The software application can be, for example, hosted by the clustered computing environment 1300 and execute on an ongoing basis. At block 1404, the application performance evaluator 1320 collects an application load of the software application at periodic intervals. For example, the application load can be collected and stored as described with respect to FIGS. 1-12. In various embodiments, the block 1404 can encompass collecting data related to a plurality of metrics representative of the application load.

At block 1406, the application performance evaluator 1320 generates an application-behavior baseline for the software application. The application-behavior baseline typically includes a plurality of projected application loads over a future period of time. The projected application loads can be values that are predicted as described, for example, with respect to FIGS. 1-12. The application-behavior baseline can have a configurable time resolution. For example, the application-behavior baseline can include projected application loads at any desired interval such as, for example, hourly intervals, half-hour intervals, twenty-minute intervals, etc. In various embodiments, the application-behavior baseline can include projected application loads at non-uniform intervals. For example, the application-behavior baseline can include a greater time resolution during subperiods over which greater fluctuation of application load is expected, and a lesser time resolution during subperiods over which less fluctuation of the application load is expected.

At block 1408, the application performance evaluator 1320 identifies one or more subperiods of the future period over which proactive scaling may occur. The one or more subperiods can, but do not need to, cover an entirety of the future period. In some embodiments, the one or more subperiods may correspond to pre-established intervals of the future period of time (e.g., hourly, every half-hour, etc.). In these embodiments, the pre-established intervals may correspond to a time resolution of the application-behavior baseline. For example, if the application-behavior baseline includes projected application loads at two-hour intervals, the one or more subperiods may each similarly cover a two-hour interval.

In various embodiments, the one or more subperiods may instead be detected by the application performance evaluator 1320. For example, a plurality of value ranges could be established such that each subperiod could covers a range of time over which the project application loads are within a same value range. The detection can also be performed, for example, by statistically evaluating change in the application-behavior baseline over the future period. For example, a plurality of standard-deviation ranges could be established such that each subperiod covers a range of time over which the projected application load is within a same range of standard deviations relative to a mean value (e.g., mean value over the future period). Other statistical bases for detecting the one or more subperiod, statistical or otherwise, may also be utilized.

In some embodiments, the one or more subperiods can include a combination of detected subperiods and pre-established subperiods. For example, the one or more subperiods could include subperiods at the pre-established intervals (e.g., every four hours), which could then be further subdivided if statistical or raw change is detected within the pre-established intervals. In still other embodiments, the one or more subperiods can constitute ranges of time over which distinct quantities of the compute resources 1312 are deemed necessary or desirable. In these embodiments, the block 1408 may be subsumed within block 1410 (described below).

At block 1410, for at least some of the one or more subperiods, the application performance evaluator 1320 automatically determines a quantity of compute resources required to manage the software application in satisfaction of at least one performance criterion. The at least one performance criterion is typically expressable in terms of the application load as described above. The determined quantity of compute resources may be, for example, a defined number of machine instances (e.g., virtual machine instances). The quantity may be determined, for example, by a rule or formula. In some embodiments, the determined quantity may be limited, for example, by a minimum or maximum quantity. For example, an SLA or other agreement may require that the software application must be provisioned at least two machine instances, that the software application cannot be provisioned more than four machine instances, etc. Examples of processes that can be performed at the block 1410 will be described with respect to FIG. 14B.

At block 1412, the application performance evaluator 1320 automatically causes each determined quantity to be proactively provisioned to the software application in advance of a start of the respective subperiod. In a typical embodiment, the application performance evaluator 1320 causes the proactive provisioning by communicating instructions to the provisioning system 1330, which implements the proactive provisioning. In various embodiments, the proactive provisioning is triggered at least a configurable lead time before the start of a given subperiod. For example, if it is determined that twenty minutes should be allowed before a VM instance is ready to share the load of the software application, the configurable lead time may be twenty minutes or greater.

For example, if the determined quantity is greater than a then-existing quantity (e.g., the quantity for the previous subperiod), the application performance evaluator 1320 may cause the software application to scale out. Scaling out involves spawning a sufficient number of new virtual machine instances to attain the determined quantity. The new virtual machine instances are typically identical to the virtual machine instance(s) executing the software application at that time. By way of further example, if the determined quantity is less than the then-existing quantity, the application performance evaluator 1320 may cause the software application to scale in. Scaling in typically includes shutting down one or more virtual machine instances (e.g., beginning with the most recently created virtual machine instances) so that the determined quantity is attained. In a typical embodiment, all virtual machine instances in use at a given time can be managed by a load balancer.

Figure 14B:
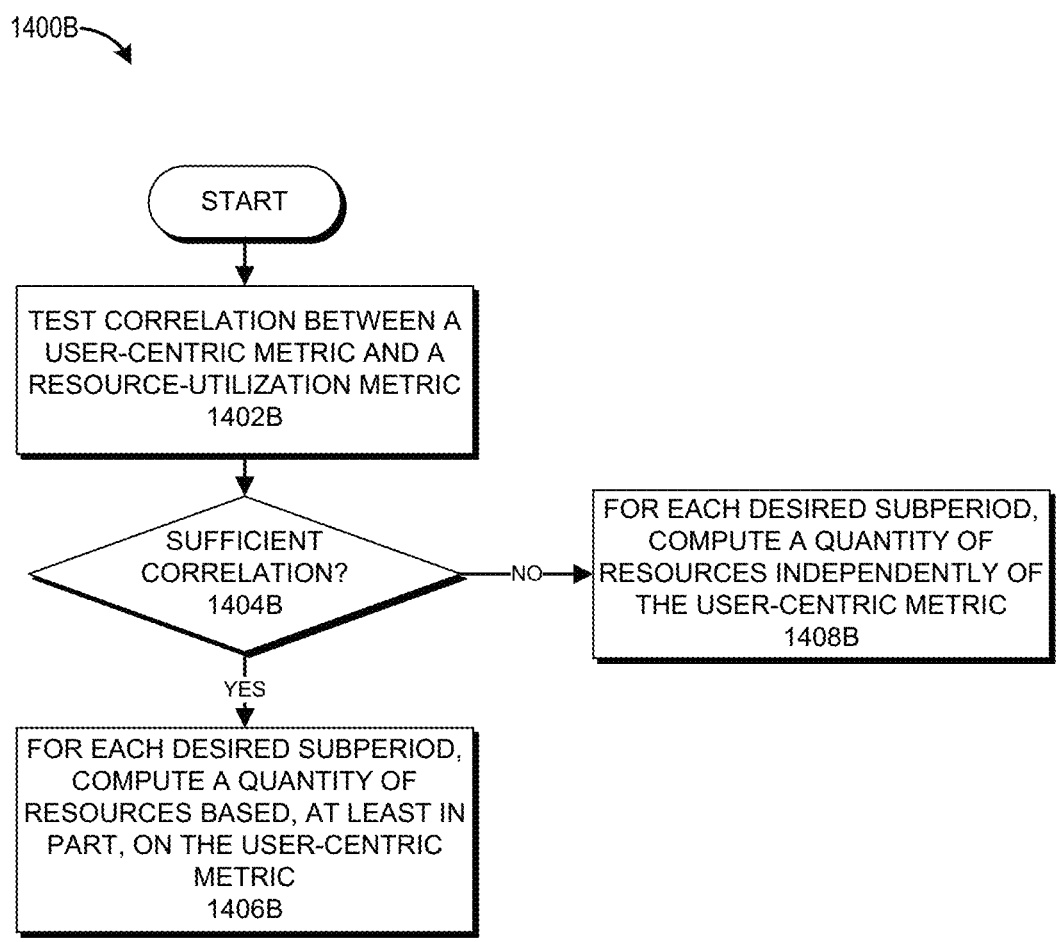
FIG. 14B illustrates a flowchart of an embodiment of a process for automatically determining a quantity of compute resources required to manage a software application.

FIG. 14B illustrates a flowchart of an embodiment of a process 1400B for automatically determining a quantity of compute resources required to manage a software application. In various embodiments, the process 1400B can be performed as all or part of the block 1410 of FIG. 14A. The process 1400B can be implemented, at least in part, by any system that can identify and assess values of metrics. For example, the process 1400B, in whole or in part, can be implemented by the application performance evaluator 1320, the data mining system 1322, the metric predictor 1324, the time resolution ranking system 1326, the application provisioning manager 1328, and/or the provisioning system 1330. Although any number of systems, in whole or in part, can implement the process 1400B, to simplify discussion, portions of the process 1400B will be described with reference to particular systems.

At block 1402B, the application performance evaluator 1320 tests a correlation between a user-centric metric and a resource-utilization metric. In general, the user-centric metric and the resource-utilization metric can each be used to characterize application load as described above. However, more specifically, the user-centric metric is a metric deemed important by a user, client, administrator, owner, and/or the like. For example, the user-centric metric can be a performance requirement specified, for example, by one or more SLAs. The resource-utilization metric is generally a metric that is representative of an extent to which resources are utilized at a given time. For example, in some embodiments, the resource-utilization metric can be CPU utilization expressed as percentage.

For example, in certain embodiments, the block 1402B can encompass performing linear correlation. In these embodiments, the application performance evaluator 1320 calculates a linear correlation of a set of historical values of the user-centric metric to a set of historical values of the resource-utilization metric. Each set of historical values may be, for example, collected at the block 1404 of FIG. 14A. Equation 13 below depicts an example of calculating the linear correlation (Lc) relative to the set of historical values of the user-centric metric (x) and the set of historical values of the resource-utilization metric (y). Each historical user-centric value ($x_i$) generally corresponds to a same period of time (or point in time) as a corresponding historical resource-utilization value ($y_i$) (e.g., from the block 1404 of FIG. 14A). In the context of Equation 13, the set of historical values of the user-centric metric (x) and the set of historical values of the resource-utilization metric each include n values. The linear correlation (Lc) can range from minus one to positive one, with a higher value indicating a better correlation.

$$Lc = \frac{n\sum_{i=1}^{n} x_i y_i - \sum_{i=1}^{n} x_i \sum_{i=1}^{n} y_i}{\sqrt{n\sum_{i=1}^{n} x_i^2 - \left(\sum_{i=1}^{n} x_i\right)^2} - \sqrt{n\sum_{i=1}^{n} y_i^2 - \left(\sum_{i=1}^{n} y_i\right)^2}}$$

Equation 13

At decision block 1404B, the application performance evaluator 1320 determines whether, with respect to the software application, a sufficient correlation exists between the user-centric metric and the resource-utilization metric. For example, in various embodiments in which linear correlation is utilized, sufficient correlation can be determined by comparing a result of Equation 13 above to a threshold value. If it is determined at the decision block 1404B that sufficient correlation exists, the process 1400B proceeds to block 1406B.

At block 1406B, for each desired subperiod, the application performance evaluator 1320 computes a quantity of compute resources based, at least in part, on the user-centric metric. For example, in some embodiments, the application performance evaluator 1320 can compute the quantity of compute resources for each subperiod identified at the block 1408 of FIG. 14A. By way of further example, in some embodiments, the application performance evaluator 1320 can compute the quantity of compute resources for each subperiod for which a value of the user-centric metric meets established criteria, for example, from one or more SLAs (e.g., exceeds or falls below a threshold value).

Equation 14 is an example of a linear formula that can be utilized to calculate a resource-utilization value $(y_r)$ for a predicted value of a user-centric metric $(x_u)$. The predicted value of the user-centric metric can be, for example, from the application-behavior baseline generated at the block 1406 of FIG. 14A. Equation 15 illustrates an exemplary formula (i.e., least square linear regression) that can be used to supply values for a slope (i.e., a) and a y-intercept (i.e., b). In general, Equation 15 operates with respect to the set of historical values of the user-centric metric (x) and the set of historical values of the resource-utilization metric (y) described above with regard to the block 1402B. The variable n, for purposes of Equation 15, corresponds to a number of values in each set.

$$y_r = ax_u + b \qquad \text{Equation 14}$$

$$a = \frac{n\sum_{i=1}^{n} x_i y_i - \sum_{i=1}^{n} x_i \sum_{i=1}^{n} y_i}{n\sum_{i=1}^{n} x_i^2 - \left[\sum_{i=1}^{n} x_i\right]^2} \qquad \text{Equation 15}$$

$$b = \frac{n\sum_{i=1}^{n} y_i - a\sum_{i=1}^{n} x_i}{n}$$

Using Equation 14, the resource-utilization value $(y_r)$ can be calculated for the predicted value of the user-centric metric $(x_u)$. In general, the predicted value of the user-centric metric $(x_u)$ relates to a subperiod of a future subperiod as described above. In that way, the resource-utilization can be a calculation of resource utilization that corresponds to the application load as represented by the user-centric metric (x).

For example, suppose that the user-centric metric (x) is requests per hour and the resource-utilization metric (y) is CPU utilization. Further suppose that the values of the user-centric metric and the resource-utilization metric are as shown in Table 3 below. Using Equation 15, values of the slope (a) and the y-intercept (b) can be computed as 5 and 15, respectively. Using Equation 14 above, the equation shown below as Equation 16 can be derived and used to represent a linear relationship between the user-centric metric (x) and the resource-utilization metric (y). For a given predicted value of the user-centric metric $(x_u)$, the resource-utilization value $(y_r)$ can be computed. For example, if for a given subperiod the predicted value of the user-centric metric $(x_u)$ equals 10, the resource-utilization metric could computed to be sixty-five percent.

TABLE 3

| User-Centric Metric (X) | Resource-Utilization Metric (Y) |
|---|---|
| $x_1$ = 1 request | $y_1$ = 20% |
| $x_2$ = 2 requests | $y_2$ = 25% |
| $x_3$ = 3 requests | $y_3$ = 30% |
| $x_4$ = 4 requests | $y_4$ = 35% |
| $x_5$ = 5 requests | $y_5$ = 40% |

$$y_r = 5x_u + 15 \qquad \text{Equation 16}$$

In certain embodiments, the resource-utilization value $(y_r)$ can be further manipulated to yield the quantity of compute resources needed to manage the user-centric metric. For example, as mentioned above, in certain embodiments, the quantity of compute resources can be representative of a number of machine instances (e.g., virtual machine instances). Equation 17 below illustrates an example of how a quantity (Q) of resource can be computed from the resource-utilization value $(y_r)$, where m is representative of a number of processors per machine instance. According to this example, if the resource-utilization value $(y_r)$ equals one-hundred sixty-five percent and m equals one, then the quantity (Q) would equal two such that two machine instances would be advisable. After block 1406B, the process 1400B ends.

$$Q = \text{ceiling}\left(\frac{\frac{y_r}{100}}{m}\right) \qquad \text{Equation 17}$$

If it is determined at the decision block 1404B that sufficient correlation does not exist, the process 1400B proceeds to block 1408B. At block 1408B, for each desired subperiod, the application performance evaluator 1320 computes a quantity of compute resources independently of the user-centric metric. For example, in some embodiments, the application-behavior baseline includes a predicted value of the resource-utilization metric for each desired subperiod. In these embodiments, the predicted value of the resource-utilization metric can be substituted into Equation 17 as the resource-utilization value $(y_r)$ and the quantity (Q) can be calculated as describe above. In some cases, incremental proactive scaling can be utilized so that, for example, if Equation 17 would result in an increase or decrease in a quantity of compute resources, then only a minimal adjustment may be made (e.g., increase or decrease by one machine instance). After block 1408B, the process 1400B ends.

Figure 15:
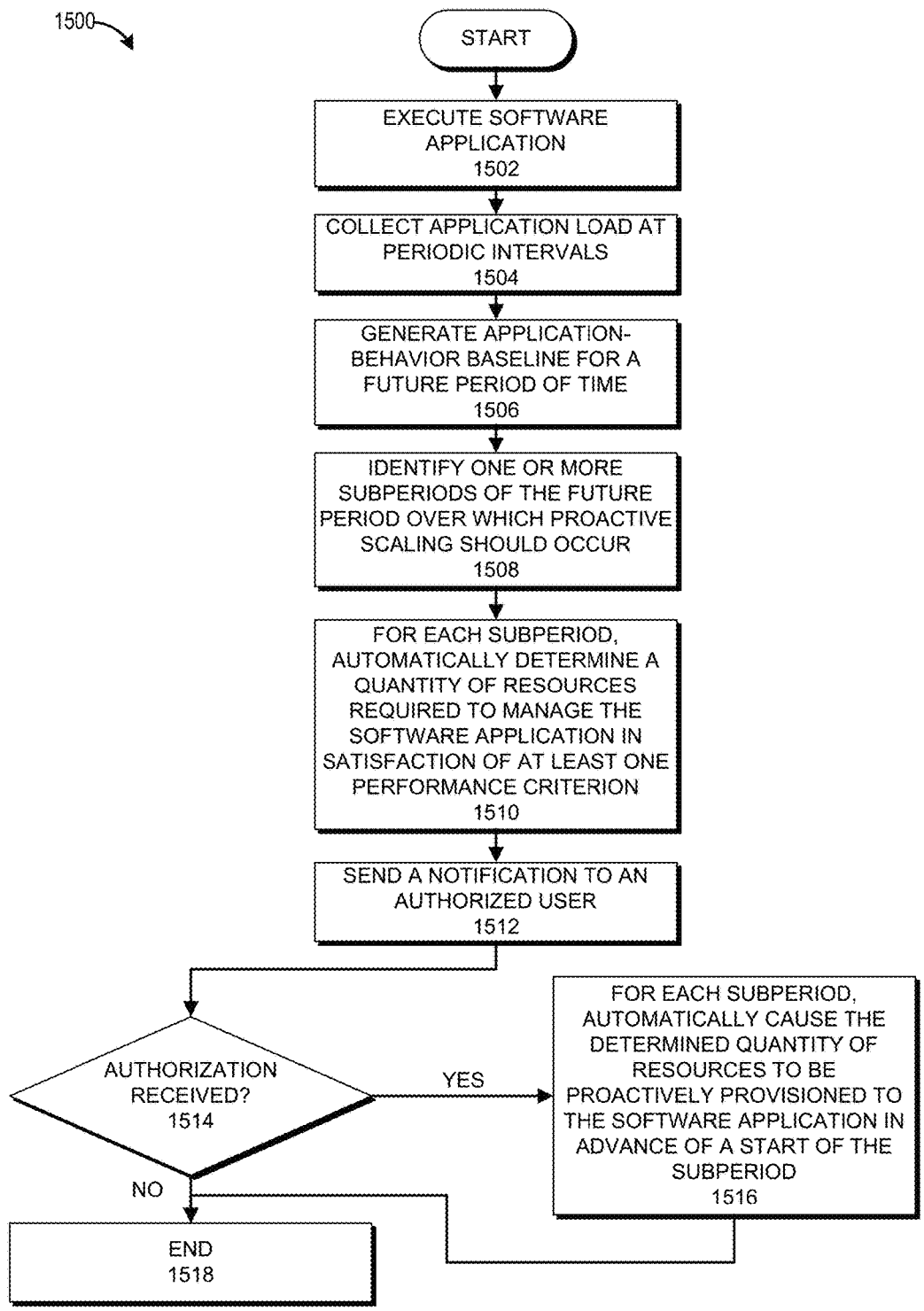
FIG. 15 illustrates a flowchart of an embodiment of a process for proactive scaling of a software application.

FIG. 15 illustrates a flowchart of an embodiment of a process 1500 for proactive scaling of a software application. For simplicity of description, the process 1500 is described with respect to a single software application. However, it should be appreciated that, in various embodiments, the process 1500 can be performed for each of a plurality of software applications such as, for example, the software applications 1332 of FIG. 13.

The process 1500 can be implemented, at least in part, by any system that can identify and assess values of metrics. For example, the process 1500, in whole or in part, can be implemented by the application performance evaluator 1320, the data mining system 1322, the metric predictor 1324, the time resolution ranking system 1326, the application provisioning manager 1328, and/or the provisioning system 1330. Although any number of systems, in whole or in part, can implement the process 1500, to simplify discussion, portions of the process 1500 will be described with reference to particular systems.

Blocks 1502-1510 are generally performed as described with respect to blocks 1402-1410 of the process 1400 of FIG. 14A. At block 1512, the application performance evaluator 1320 sends a notification to an authorized user such as, for example, an administrator, for authorization of the determined quantity. At decision block 1514, it is determined whether authorization for the determined quantity has been received. If not, the process 1500 proceeds to block 1518 and ends without the determined quantity being provisioned. If it is determined at the decision block 1516 that authorization for the determined quantity has been received, the process 1500 proceeds to block 1516. At block 1516, for each of the one or more subperiods, the application performance evaluator 1320 automatically causes the determined quantity to be proactively provisioned to the software application in advance of a start of the subperiod. In a typical embodiment, the block 1516 is performed as described with respect to the block 1412 of FIG. 14A. After the block 1516, the process 1500 proceeds to the block 1518 and ends.

Example of a Reactive Scaling Process

In various embodiments, proactive scaling and provisioning as described above can be supplemented with reactive scaling and provisioning. Reactive scaling may be utilized to address situations when, for example, observed application loads deviate from an application-performance baseline. In such cases, reactionary measures can be taken. An example will be described with respect to FIG. 16.

Figure 16:
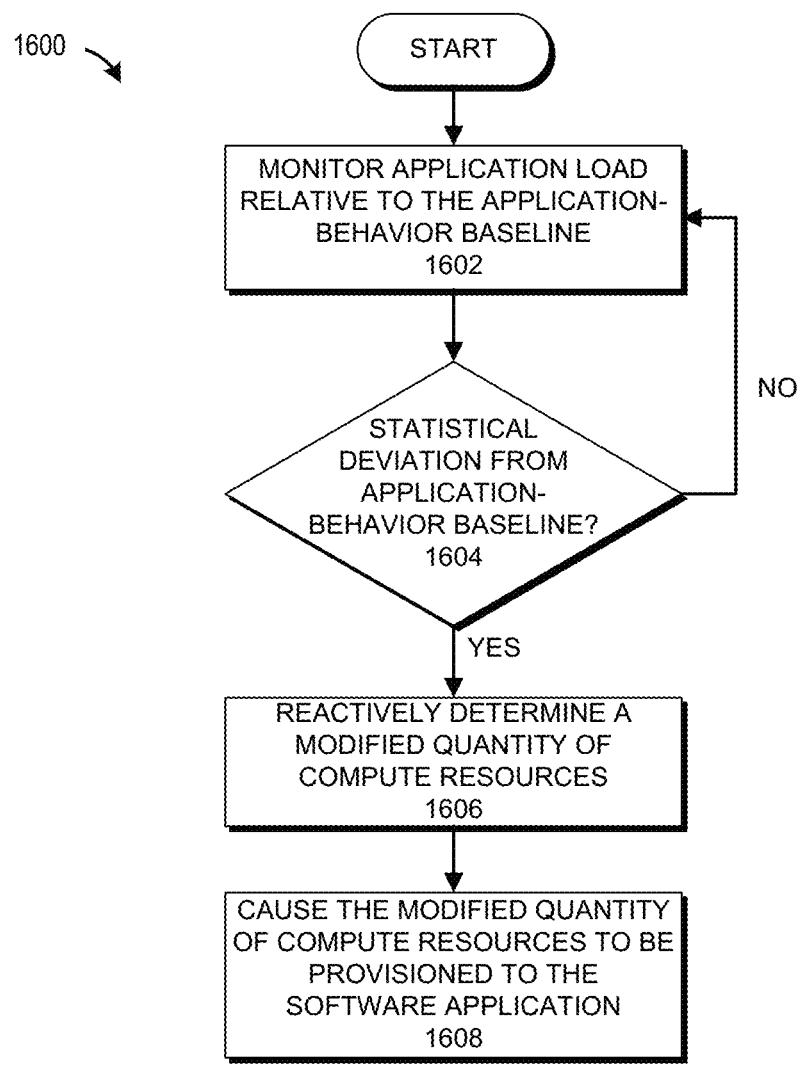
FIG. 16 illustrates a flowchart of an embodiment of a process for reactive scaling of a software application.

FIG. 16 illustrates a flowchart of an embodiment of a process 1600 for reactive scaling of a software application. For simplicity of description, the process 1600 is described with respect to a single software application. However, it should be appreciated that, in various embodiments, the process 1600 can be performed for each of a plurality of software applications such as, for example, the software applications 1332 of FIG. 13.

The process 1600 can be implemented, at least in part, by any system that can identify and assess values of metrics. For example, the process 1600, in whole or in part, can be implemented by the application performance evaluator 1320, the data mining system 1322, the metric predictor 1324, the time resolution ranking system 1326, the application provisioning manager 1328, and/or the provisioning system 1330. Although any number of systems, in whole or in part, can implement the process 1600, to simplify discussion, portions of the process 1600 will be described with reference to particular systems.

At block 1602, the application performance evaluator 1320 monitors an application load of the software application relative to the application-behavior baseline. At decision block 1604, the application performance evaluator 1320 determines whether there has been a sufficient statistical deviation from the application-behavior baseline to warrant reactive measures. In a typical embodiment, the determination involves requiring a sufficient deviation (e.g., defined in terms of metric values or standard deviation relative to a mean) over a sufficient length of time (e.g., five minutes). If it is determined at the decision block 1604 that there has not been a sufficient statistical deviation from the application-behavior baseline, the process 1600 returns to the block 1602. If it is determined at the decision block 1604 that there has been a sufficient statistical deviation from the application-behavior baseline, at the process 1600 proceeds to block 1606.

At the block 1606, the application performance evaluator 1320 reactively determines a modified quantity of compute resources. In various embodiments, the determination can be rule or formula-based as described with respect to the block 1410 of FIG. 14A. At the block 1608, the application performance evaluator 1320 causes the modified quantity to be provisioned to the software application. In a typical embodiment, the block 1608 is performed in a similar fashion to the block 1412 described above.

Terminology

A number of computing systems have been described throughout this disclosure. The descriptions of these systems are not intended to limit the teachings or applicability of this disclosure. For example, the user systems described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS or iOS, a Linux or Unix-based OS, combinations of the same, or the like.

Further, the processing of the various components of the illustrated systems can be distributed across multiple machines, networks, and other computing resources. In addition, two or more components of a system can be combined into fewer components. For example, the various systems illustrated as part of the system evaluator 120 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
   executing at least one application on a computer system;
   the computer system collecting, at periodic intervals as the at least one application executes, values of an application load of each of the at least one application;
   retrieving, by the computer system, a prediction configuration previously associated with the application load of the at least one application, the prediction configuration comprising a selected period-combination data structure from among a plurality of alternative period combination data structures, wherein each period-combination data structure of the plurality of alternative period-combination data structures represents a same set of the collected values of the at least one application over the same historical period of time;
   wherein, for each period-combination data structure of the plurality of alternative period combination data structures:
   the period-combination data structure comprises a different selection of two or more time periods of a plurality of time periods;
   each time period of the two or more time periods comprises segments corresponding to divisions of said same historical period of time;
   the two or more time periods each span said same historical period of time at a different sampling rate, such that each of the two or more time periods includes a different number of segments; and
   for each collected value of the collected values, the collected value has been incrementally inserted into corresponding segments of the two or more time periods, the incremental insertion comprising, for each time period of the two or more time periods, iterating from highest-frequency time period to lowest-frequency time period:
   identifying a corresponding segment of the time period for the collected value;
   computing a predicted value for the corresponding segment;
   adapting the collected value based on any higher-frequency time periods of the period-combination data structure;
   wherein, if the time period is the highest-frequency time period of the two or more time periods, the adapted collected value comprises the collected value;
   wherein, if the time period is not the highest-frequency time period of the two or more time periods, the adapted collected value comprises a difference between the adapted collected value and the predicted value for the corresponding segment of the immediately higher-frequency time period; and
   inserting the adapted collected value for the time period into the corresponding segment of the time period;
   the computer system generating, using the adapted historical collected values of the selected period-combination data structure, an application-behavior baseline for each of the at least one application, the application-behavior baseline comprising a plurality of projected application loads over a future period of time;
   the computer system automatically determining, for each subperiod of a plurality of subperiods of the future period, using the application-behavior baseline, a quantity of compute resources required to manage the at least one application in satisfaction of at least one performance criterion; and
   for each subperiod of the plurality of subperiods, the computer system causing the determined quantity of compute resources to be proactively provisioned to the at least one application in advance of a start of the subperiod.

2. The method of claim 1, wherein, for each subperiod of the plurality of subperiods:
   the automatically determining comprises automatically determining a number of machine instances required to manage the at least one application over the subperiod; and
   the causing comprises causing the determined number of machine instances to be proactively provisioned to the at least one application in advance of the start of the subperiod.

3. The method of claim 2, wherein the machine instances comprise virtual machine instances.

4. The method of claim 1, wherein the plurality of subperiods cover an entirety of the future period.

5. The method of claim 1, wherein the plurality of projected application loads are measured using one or more application-performance metrics selected from the group consisting of: memory utilization, processor utilization, operation completion rate, storage utilization, network bandwidth, and end-user experience management metrics.

6. The method of claim 1, comprising:
prior to the causing, sending a notification to an authorized user, the notification comprising the determined quantity of compute resources;
receiving authorization from the authorized user; and
wherein the causing is performed responsive to the received authorization.

7. The method of claim 1, wherein the at least one application comprises a plurality of applications.

8. The method of claim 7, comprising performing the method for each of the at least one application.

9. The method of claim 1, comprising:
based at least in part on the collecting, identifying at least one statistical deviation from the application-behavior baseline;
responsive to the identifying, reactively determining a modified quantity of compute resources; and
causing the modified quantity of compute resources to be provisioned to the at least one application.

10. The method of claim 1, wherein the causing comprises causing the at least one application to be at least of one scaled up and scaled out.

11. The method of claim 1, wherein the causing comprises causing the at least one application to be at least one of scaled down and scaled in.

12. The method of claim 1, wherein:
the collecting comprises collecting, at periodic intervals as the at least one application executes, an application load of at least one subunit of the at least one application;
the generating comprises generating the application-behavior baseline for the at least one subunit;
the automatically determining comprises automatically determining, for each subperiod of the plurality of subperiods, a quantity of compute resources required to manage the at least one subunit in satisfaction of at least one performance criterion; and
the causing comprises, for each subperiod of the plurality of subperiods, causing the determined quantity of compute resources to be proactively provisioned to the at least one subunit in advance of the start of the subperiod.

13. The method of claim 12, wherein the at least one subunit comprises a role instance of the at least one application.

14. The method of claim 12, comprising:
wherein the at least one subunit comprises a plurality of subunits of the at least one application; and
performing the method for each subunit of the plurality of subunits.

15. The method of claim 1, wherein the automatically determining comprises:
testing a correlation between a user-centric metric and a resource-utilization metric; and
responsive to a determination that the correlation between the user-centric metric and the resource-utilization metric is sufficient, computing the quantity of compute resources based, at least in part, on the user-centric metric.

16. The method of claim 15, wherein the automatically determining comprises:
responsive to a determination that the correlation between the user-centric metric and the resource-utilization metric is not sufficient, computing the quantity of compute resources independently of the user-centric metric.

17. An information handling system comprising at least one server computer and memory, wherein the at least one server computer and memory in combination are operable to implement a method comprising:
executing at least one application;
collecting, at periodic intervals as the at least one application executes, values of an application load of each of the at least one application;
retrieving a prediction configuration previously associated with the application load of the at least one application, the prediction configuration comprising a selected period-combination data structure from among a plurality of alternative period-combination data structures, wherein each period-combination data structure of the plurality of alternative period-combination data structures represents a same set of the collected values of the at least one application over the same historical period of time;
wherein, for each period-combination data structure of the plurality of alternative period-combination data structures:
the period-combination data structure comprises a different selection of two or more time periods of a plurality of time periods;
each time period of the two or more time periods comprises segments corresponding to divisions of said same historical period of time;
the two or more time periods each span said same historical period of time at a different sampling rate, such that each of the two or more time periods includes a different number of segments; and
for each collected value of the collected values, the collected value has been incrementally inserted into corresponding segments of the two or more time periods, the incremental insertion comprising, for each time period of the two or more time periods, iterating from highest-frequency time period to lowest-frequency time period:
identifying a corresponding segment of the time period for the collected value;
computing a predicted value for the corresponding segment;
adapting the collected value based on any higher-frequency time periods of the period-combination data structure;
wherein, if the time period is the highest-frequency time period of the two or more time periods, the adapted collected value comprises the collected value;
wherein, if the time period is not the highest-frequency time period of the two or more time periods, the adapted collected value comprises a difference between the adapted collected value and the predicted value for the corresponding segment of the immediately higher-frequency time period; and
inserting the adapted collected value for the time period into the corresponding segment of the time period;
generating, using the adapted historical values of the selected period-combination data structure, an application-behavior baseline for each of the at least one application, the application-behavior baseline comprising a plurality of projected application loads over a future period of time;

automatically determining, for each subperiod of a plurality of subperiods of the future period, using the application-behavior baseline, a quantity of compute resources required to manage the at least one application in satisfaction of at least one performance criterion; and for each subperiod of the plurality of subperiods, causing the determined quantity of compute resources to be proactively provisioned to the at least one application in advance of a start of the subperiod.

18. The information handling system of claim 17, wherein, for each subperiod of the plurality of subperiods:

the automatically determining comprises automatically determining a number of machine instances required to manage the at least one application over the subperiod; and the causing comprises causing the determined number of machine instances to be proactively provisioned to the at least one application in advance of the start of the subperiod.

19. A computer-program product comprising a non-transitory computer-usable medium having computer-readable program code embodied therein, the computer-readable program code adapted to be executed to implement a method comprising:

executing at least one application;

collecting, at periodic intervals as the at least one application executes, values of an application load of each of the at least one application;

retrieving a prediction configuration previously associated with the application load of the at least one application, the prediction configuration comprising a selected period-combination data structure from among a plurality of alternative period-combination data structures, wherein each period-combination data structure of the plurality of alternative period-combination data structures represents a same set of the collected values of the at least one application over the same historical period of time;

wherein, for each period-combination data structure of the plurality of alternative period-combination data structures:

the period-combination data structure comprises a different selection of two or more time periods of a plurality of time periods;

each time period of the two or more time periods comprises segments corresponding to divisions of said same historical period of time;

the two or more time periods each span said same historical period of time at a different sampling rate, such that each of the two or more time periods includes a different number of segments; and for each collected value of the collected values, the collected value has been incrementally inserted into corresponding segments of the two or more time periods, the incremental insertion comprising, for each time period of the two or more time periods, iterating from highest-frequency time period to lowest-frequency time period:

identifying a corresponding segment of the time period for the collected value;

computing a predicted value for the corresponding segment;

adapting the collected value based on any higher-frequency time periods of the period-combination data structure;

wherein, if the time period is the highest-frequency time period of the two or more time periods, the adapted collected value comprises the collected value;

wherein, if the time period is not the highest-frequency time period of the two or more time periods, the adapted collected value comprises a difference between the adapted collected value and the predicted value for the corresponding segment of the immediately higher-frequency time period; and inserting the adapted collected value for the time period into the corresponding segment of the time period;

generating, using the adapted historical values of the selected period-combination data structure, an application-behavior baseline for each of the at least one application, the application-behavior baseline comprising a plurality of projected application loads over a future period of time;

automatically determining, for each subperiod of a plurality of subperiods of the future period, using the application-behavior baseline, a quantity of compute resources required to manage the at least one application in satisfaction of at least one performance criterion; and for each subperiod of the plurality of subperiods, causing the determined quantity of compute resources to be proactively provisioned to the at least one application in advance of a start of the subperiod.

* * * * *